(12) United States Patent
Nakata et al.

(10) Patent No.: US 8,894,159 B2
(45) Date of Patent: Nov. 25, 2014

(54) BRAKE CONTROLLING DEVICE

(75) Inventors: Daisuke Nakata, Seto (JP); Tsukasa Fukasawa, Nishikamo-gun (JP); Eiji Nakamura, Nishikamo-gun (JP); Takahiro Okano, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 371 days.

(21) Appl. No.: 13/260,040

(22) PCT Filed: Mar. 25, 2009

(86) PCT No.: PCT/JP2009/001338
§ 371 (c)(1),
(2), (4) Date: Feb. 9, 2012

(87) PCT Pub. No.: WO2010/109525
PCT Pub. Date: Sep. 30, 2010

(65) Prior Publication Data
US 2012/0126610 A1    May 24, 2012

(51) Int. Cl.
| | | |
|---|---|---|
| *B60T 8/88* | (2006.01) | |
| *B60T 8/40* | (2006.01) | |
| *B60T 17/22* | (2006.01) | |
| *B60T 13/68* | (2006.01) | |
| *B60T 1/10* | (2006.01) | |
| *B60T 7/04* | (2006.01) | |
| *B60T 8/94* | (2006.01) | |

(52) U.S. Cl.
CPC .............. *B60T 1/10* (2013.01); *B60T 8/4081* (2013.01); *B60T 2270/403* (2013.01); *B60T 17/221* (2013.01); *B60T 13/686* (2013.01); *B60T 7/042* (2013.01); *B60T 8/94* (2013.01); *B60T 2270/406* (2013.01)

USPC .................. 303/122.09; 303/122; 303/191

(58) Field of Classification Search
USPC ................. 303/122, 122.09, 191, 20, DIG. 1, 303/DIG. 2
See application file for complete search history.

(56) References Cited

U.S. PATENT DOCUMENTS

2007/0108837 A1    5/2007    Ohkubo et al.
2008/0234909 A1    9/2008    Iwasaki et al.

FOREIGN PATENT DOCUMENTS

| EP | 0965509 A2 | 12/1999 |
|---|---|---|
| EP | 1251052 A2 | 10/2002 |
| EP | 1642795 A1 | 4/2006 |
| EP | 1795416 A1 * | 6/2007 |

(Continued)

OTHER PUBLICATIONS

English machine translation of JP 11-115740 (Akira).*

(Continued)

*Primary Examiner* — Robert A Siconolfi
*Assistant Examiner* — Vu Q Nguyen
(74) *Attorney, Agent, or Firm* — Kenyon & Kenyon LLP

(57) ABSTRACT

In a brake controlling device (20), a separating valve (60) is provided in a main flow path (45) for interconnecting a first liquid pressure circuit and a second liquid pressure circuit. When an abnormality detecting section detects an abnormality relating to brake fluid pressure, a controlling section sets the separating valve (60) to a closed state. A leakage suppressing section performs leakage suppressing processing for suppressing entry of a brake fluid, which is in the first liquid pressure circuit, into the second liquid pressure circuit after the separating valve (60) is set to the closed state. A leakage suppressing section sets a master cut valve (64) to a closed state to perform the leakage suppressing processing.

17 Claims, 21 Drawing Sheets

(56) References Cited

FOREIGN PATENT DOCUMENTS

| JP | 3-045455 A | 2/1991 |
| JP | 04-011982 U | 1/1992 |
| JP | 11-115740 A | 4/1999 |
| JP | 2007-131247 A | 5/2007 |
| JP | 2007-203859 A | 8/2007 |
| JP | 2007-230419 A | 9/2007 |
| JP | 2008-179228 A | 8/2008 |
| JP | 2008-222169 A | 9/2008 |

OTHER PUBLICATIONS

International Preliminary Report of Patentability of PCT/JP2009/001338 issued Jul. 21, 2011 and English translation thereof.
International Search Report mailed Jun. 30, 2009 of PCT/JP2009/001338 & Written Opinion.

* cited by examiner

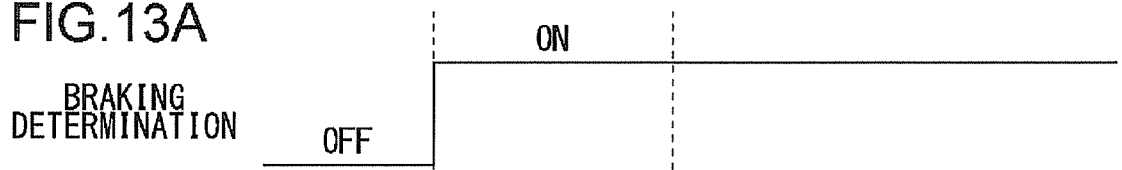
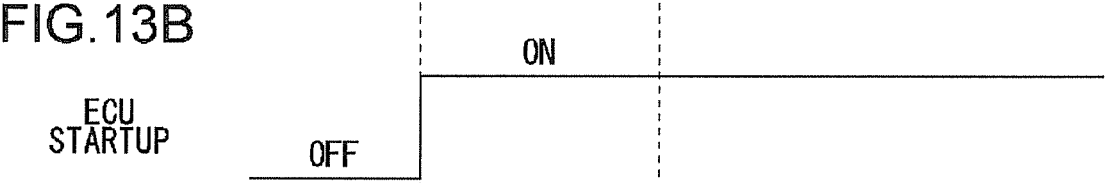
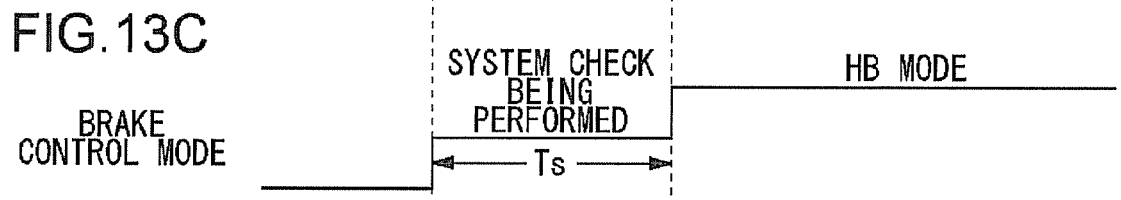
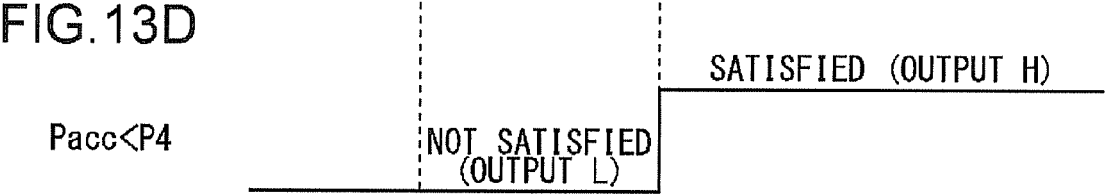

BRAKE CONTROLLING DEVICE

This is a 371 national phase application of PCT/JP2009/001338 filed Mar. 25, 2009, the contents of which are incorporated herein by reference.

TECHNICAL FIELD

The present invention relates to a brake control apparatus for controlling braking force that is applied to a wheel provided on a vehicle.

BACKGROUND ART

A brake control apparatus is known that is provided with: a hydraulic pressure circuit that supplies hydraulic pressure to a wheel cylinder from a manual hydraulic pressure source; and a hydraulic pressure circuit that supplies hydraulic pressure to a wheel cylinder from an accumulator (for example, see patent document 1). The brake control apparatus is provided with a brake ECU that brings a pressure control mechanism into operation under no control operation in the absence of a brake operation and generates a differential pressure between both sides of an isolation valve, which divides the circuit of hydraulic pressure from the manual hydraulic pressure source into two systems, so as to determine, based on a change in the differential pressure, whether or not there are any leakage problems with the isolation valve.
[Patent document No. 1] JP 2007-131247

DISCLOSURE OF THE INVENTION

Problem to be Solved by the Invention

In a vehicle that is mounted with an electric motor as a travel drive source such as a hybrid vehicle and an electric-powered vehicle, there are occasions when so-called regenerative coordination control is performed at the time of braking where requested braking force is generated by using both braking force by regeneration and braking force by hydraulic pressure. Regenerative braking allows a part of kinetic energy of a moving vehicle to be collected as electrical energy at the time of braking. Thus, regenerative coordination control contributes to improvement in vehicle fuel efficiency. In order to further improve vehicle fuel efficiency, it is desirable to start regenerative coordination control immediately after the start of the travel drive source of a vehicle.

Hydraulic pressure transmitted to a wheel cylinder of each wheel by a brake control apparatus during regenerative coordination control is not generated in accordance with an operation amount of a brake operation member but is adjusted in consideration of braking force by regeneration. When a problem is detected in a mechanism for adjusting hydraulic pressure, the regenerative coordination control is discontinued, and the hydraulic pressure generated in accordance with the amount of brake operation is transmitted, without any change, to a wheel cylinder of each wheel by a manual hydraulic pressure source such as a master cylinder. Forming a hydraulic pressure transmission circuit, which is for transmitting hydraulic pressure from a manual hydraulic pressure source to each wheel cylinder, to be separable into two systems with use of an isolation valve allows braking force to be generated by a normal system by separating the normal system from a damaged system with use of the isolation valve even when another problem further occurs, for example, when liquid leaks from a pipeline in one system. It is preferable from a fail-safe perspective to configure a hydraulic pressure transmission circuit such that braking force is generated even when there is a double failure, as described above.

However, in a case when a normally-closed type electromagnetic control valve is employed as such an isolation valve, the isolation valve is opened when differential pressure is generated across the valve that is larger than spring force biasing the valve in a closing direction. When there is liquid leakage due to the failure of a pipeline in one system, the value of the hydraulic pressure in the system becomes close to zero. However, if a brake pedal is pressed under this state, the hydraulic pressure in the other normal system becomes high. When the differential pressure generated across the isolation valve becomes larger than the spring force at this time, the isolation valve is opened such that hydraulic fluid (hereinafter, also referred to as "brake fluid") flows from the normal system into the system having the pipeline failure, resulting in a decrease in the brake fluid in the normal system.

Therefore, it is important that the isolation valve is capable of separating the systems normally. Preferably, the hydraulic fluid can be prevented from flowing in the system having a problem from the normal system. Suitable brake control can be realized by separating the systems in a proper manner.

In this background, a purpose of the present invention is to provide a brake control apparatus capable of properly separating two systems, i.e., hydraulic pressure circuits.

Means for Solving the Problem

A brake control apparatus according to one embodiment of the present invention comprises: a first wheel cylinder configured to exert braking force on a first wheel; a second wheel cylinder configured to exert braking force on a second wheel different from the first wheel; a first hydraulic pressure circuit configured to supply brake fluid from a reservoir to the first wheel cylinder; a second hydraulic pressure circuit configured to supply the brake fluid from the reservoir to the second wheel cylinder; an isolation valve provided in a main flow channel that brings the first hydraulic pressure circuit and the second hydraulic pressure circuit into communication with each other; a problem detection unit configured to detect a problem related to brake fluid pressure; a control unit configured to bring the isolation valve into a closed state when the problem related to the brake fluid pressure is detected by the problem detection unit; and a leakage prevention unit configured to perform a leakage prevention process for preventing the brake fluid in the first hydraulic pressure circuit from flowing into the second hydraulic pressure circuit after the isolation valve is brought into the closed state by the control unit. According to the embodiment, the amount of the brake fluid in the first hydraulic pressure circuit can be maintained by performing the leakage prevention process after the isolation valve is brought into the closed state.

The leakage prevention unit may perform the leakage prevention process by bringing a master cut valve into a closed state. The leakage prevention unit is capable of preventing the brake fluid from flowing into the second hydraulic pressure circuit from the first hydraulic pressure circuit by preventing fluid pressure supply from a hydraulic pressure source. The control valve may be provided in the middle between the reservoir and the isolation valve in the first hydraulic pressure circuit. The isolation valve may be a differential pressure valve that opens when differential pressure across the isolation valve becomes at least a predetermined value P1.

The brake control apparatus may further comprise: a first fluid pressure detection unit configured to detect brake fluid pressure in the first hydraulic pressure circuit; and a second fluid pressure detection unit configured to detect brake fluid pressure in the second hydraulic pressure circuit. The leakage prevention unit may perform the leakage prevention process when differential pressure derived from a detection value by the first fluid pressure detection unit and a detection value by the second fluid pressure detection unit exceeds a predetermined value P2 that is smaller than the predetermined value P1. This allows a situation to be prevented where the brake fluid flows into the second hydraulic pressure circuit from the first hydraulic pressure circuit via the isolation valve.

The brake control apparatus may further comprise: a first determination unit configured to determine that the amount of the brake fluid in the reservoir has fallen below a standard value; a second fluid pressure detection unit configured to detect brake fluid pressure in the second hydraulic pressure circuit or a third fluid pressure detection unit configured to detect brake fluid pressure in an accumulator flow channel; a second determination unit configured to determine a pressure-drop problem based on a state where the brake fluid pressure in the second hydraulic pressure circuit is below a predetermined value P3 or where the brake fluid pressure in the accumulator flow channel is below a predetermined value P4; and a leakage detection unit configured to detect leakage of the brake fluid to the outside. The leakage detection unit may detect the leakage of the brake fluid to the outside in the second hydraulic pressure circuit when it is determined by the first determination unit that the amount of the brake fluid has fallen below the standard value and when the pressure-drop problem is determined by the second determination unit. This allows the brake fluid leakage to be detected with high accuracy.

The second determination unit may determine the pressure-drop problem upon continuation of the state for time Ta, where the brake fluid pressure in the second hydraulic pressure circuit is below the predetermined value P3, or upon continuation of the state for time Tb, where the brake fluid pressure in the accumulator flow channel is below the predetermined value P4. This allows the pressure-drop problem to be detected with high accuracy.

The brake control apparatus performs a system check at the time of startup, and the second determination unit may determine the pressure-drop problem immediately after the system check upon continuation of the state for a period of less than the time Ta, where the brake fluid pressure in the second hydraulic pressure circuit is below the predetermined value P3, or upon continuation of the state for a period of less than the time Tb, where the brake fluid pressure in the accumulator flow channel is below the predetermined value P4. This allows the pressure-drop problem to be determined earlier than usual immediately after the system check.

The leakage prevention unit may perform the leakage prevention process when the brake fluid pressure in the first hydraulic pressure circuit is above a predetermined value P5. This allows brake fluid pressure that is necessary for ensuring the braking force to be maintained when the leakage prevention process is being performed.

The leakage prevention unit may stop the leakage prevention process for the moment when the brake fluid pressure in the first hydraulic pressure circuit falls below a predetermined value P6. This allows the brake fluid pressure in the first hydraulic pressure circuit to be increased.

The brake control apparatus may further comprise a pressurization condition determination unit configured to determine a pressurization condition of the first hydraulic pressure circuit. The leakage prevention unit may perform the leakage prevention process when it is determined by the pressurization condition determination unit that the first hydraulic pressure circuit is in a pressurizable state. This allows the leakage prevention process to be performed under a state where the brake fluid leakage can occur. The pressurization condition determination unit may determine the pressurization condition based on an output from a brake pedal stroke detection unit. The leakage prevention unit may perform the leakage prevention process when it is determined by the pressurization condition determination unit that a pedal stroke amount is above a predetermined amount L1. This allows for a presumption that the brake pedal 24 is depressed with a high pedal effort, and the leakage prevention process can thus be performed.

The leakage prevention unit may discontinue the leakage prevention process that is being performed when it is determined by the pressurization condition determination unit that the first hydraulic pressure circuit is not being pressurized. This allows the leakage prevention process to be promptly discontinued under a situation where the leakage prevention process is not necessary.

The pressurization condition determination unit may store in advance a pedal stroke amount L2, which is obtained at the time of performing the leakage prevention process, and the leakage prevention unit may discontinue the leakage prevention process that is being performed when a pedal stroke amount falls below a stroke amount of L2−Lr (Lr is a predetermined amount) or a predetermined amount L3 (L3 is smaller than L1), whichever the smaller. This allows a driver to be provided with a smooth brake releasing feeling.

The brake control apparatus may further comprise a brake pedal stroke detection unit or a problem determination unit configured to determine an output problem of a brake-fluid pressure detection unit. The leakage prevention unit may discontinue the leakage prevention process that is being performed when the output problem is determined by the pressurization condition determination unit. The leakage prevention unit may discontinue the leakage prevention process that is being performed when it is determined by the first determination unit that the amount of the brake fluid has become at least the standard value. The leakage prevention unit may discontinue the leakage prevention process that is being performed when the brake fluid pressure in the accumulator flow channel is above a predetermined value P7. The leakage prevention unit may prohibit the leakage prevention process from being performed when a vehicle is being tested or on maintenance.

Advantageous Effects

According to the present invention, a brake control apparatus capable of properly separating two hydraulic pressure circuits can be provided.

BRIEF DESCRIPTION OF THE DRAWINGS

FIG. 13 is a diagram illustrating transition of processes and state values when there is the failure of a pipeline at the time the ECU is started;

Figure 1:
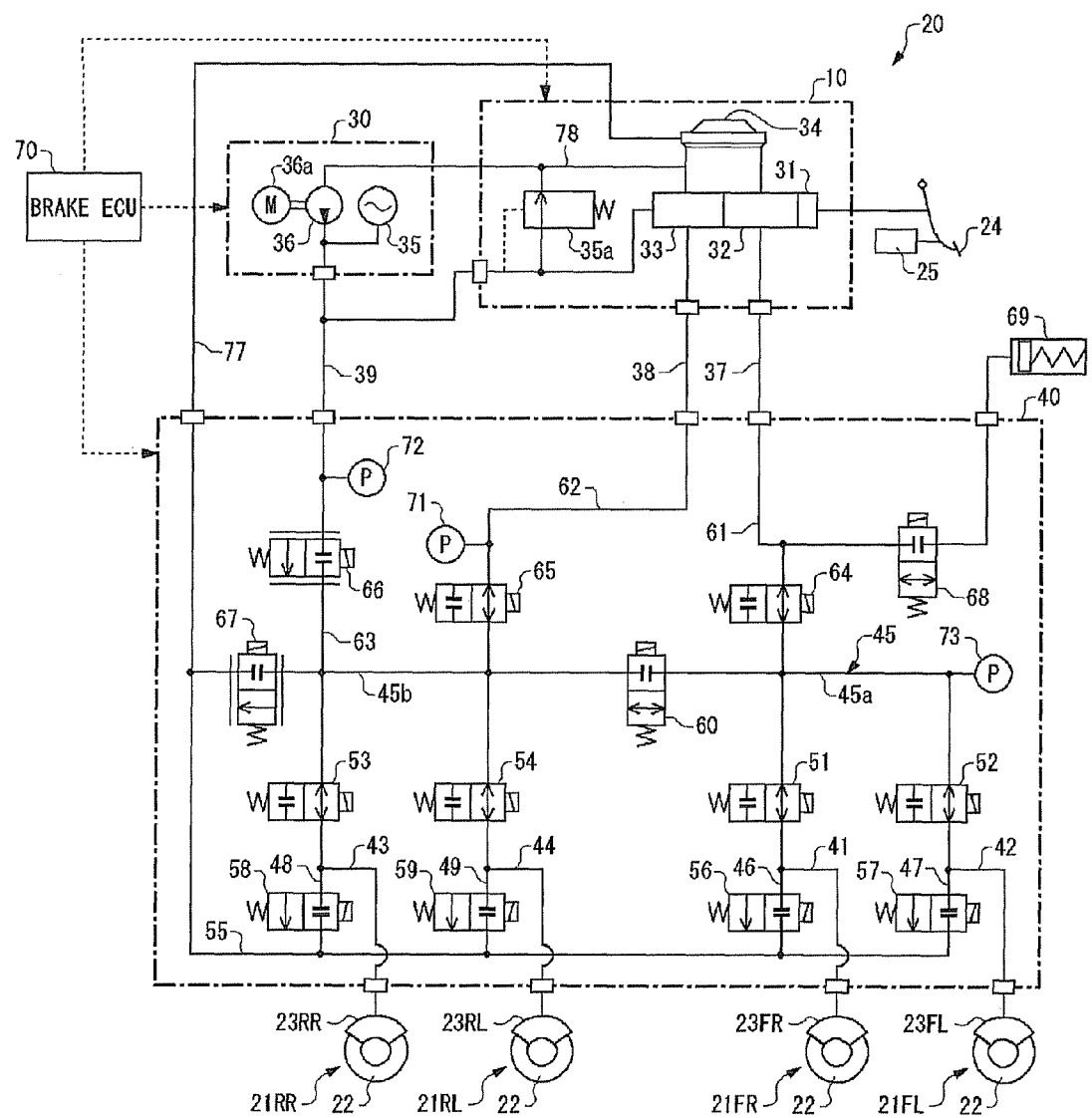
FIG. 1 is a diagram illustrating a brake control apparatus according to the present embodiment of the present invention.

EXPLANATION OF REFERENCE NUMERALS 10 master cylinder unit
20 brake control apparatus
23 wheel cylinder
24 brake pedal
25 stroke sensor
30 hydraulic power source
31 hydraulic pressure booster
32 master cylinder
33 regulator
34 reservoir
35 accumulator
37 master pipeline
38 regulator pipeline
39 accumulator pipeline
40 hydraulic pressure actuator
45a first flow channel
45b second flow channel
55 reservoir flow channel
56 ABS pressure-reducing valve
60 isolation valve
61 master flow channel
62 regulator flow channel
63 accumulator flow channel
64 master cut valve
66 pressure-increasing linear control valve
67 pressure-reducing linear control valve
68 simulator cut valve
70 brake ECU
71 regulator pressure sensor
72 accumulator pressure sensor
73 control pressure sensor
77 reservoir pipeline
78 pump pipeline
79 master chamber
80 regulator chamber
86 line for reduction determination
87 switch for detecting storage volume reduction
100 problem detection unit
102 brake mode control unit
108 HB mode determination unit
110 condition determination unit
112 storage volume determination unit
114 disconnection determination unit
116 pressure-drop problem determination unit
118 pipeline failure determination unit
120 differential pressure determination unit
122 hydraulic pressure determination unit
124 pressurization condition determination unit
126 drive mode determination unit
128 problem determination unit
150 leakage prevention unit

BEST MODE FOR CARRYING OUT THE INVENTION

A detailed description is now given of the best mode for carrying out the present invention with reference to figures in the following.

FIG. 1 illustrates a brake control apparatus 20 according to the present embodiment of the present invention. A brake control apparatus 20 shown in the figure forms an electronically controlled brake system (ECB) for a vehicle and controls braking force exerted on four wheels provided to the vehicle. The brake control apparatus 20 according to the present embodiment is mounted on, for example, a hybrid vehicle provided with an electric motor and an internal-combustion engine as running drive power sources. In such a hybrid vehicle, both regenerative braking, which is for putting a brake on the vehicle by regenerating kinetic energy of the vehicle into electrical energy, and hydraulic pressure braking by the brake control apparatus 20 can be used to put a brake on the vehicle. In a vehicle in the present embodiment, regenerative brake coordination control for producing desired braking force with a combination of these regenerative braking and hydraulic pressure braking can be performed.

As shown in FIG. 1, the brake control apparatus 20 includes: disk brake units 21FR, 21FL, 21RR, and 21RL that serve as braking force application mechanisms each provided to each wheel (not shown); a master cylinder unit 10; a hydraulic power source 30; and a hydraulic pressure actuator 40.

The disk brake units 21FR, 21FL, 21RR, and 21RL exert braking force on the right front wheel, left front wheel, right rear wheel, and left rear wheel of the vehicle, respectively. The master cylinder unit 10 that serves as a manual hydraulic pressure source feeds, to the disk brake units 21FR through 21RL, a brake fluid pressurized in accordance with the amount of the operation, by the driver, of a brake pedal 24 used as a brake operation member. The hydraulic power source 30 can feed the brake fluid, which is a working fluid pressurized by the supply of power, to the disk brake units 21FR through 21RL independently from the operation of the brake pedal 24 by the driver. The hydraulic pressure actuator 40 appropriately adjusts the hydraulic pressure of the brake fluid supplied from the hydraulic power source 30 or the master cylinder unit 10 and then delivers the adjusted brake fluid to the disk brake units 21FR through 21RL. This allows for adjustment of braking force applied to each wheel by hydraulic pressure braking. In the present embodiment, a wheel cylinder pressure control system is configured including the hydraulic power source 30 and the hydraulic pressure actuator 40.

A further detailed description is now given of the disk brake units 21FR through 21RL, the master cylinder unit 10, the hydraulic power source 30, and the hydraulic pressure actuator 40 in the following. The disk brake units 21FR through 21RL include wheel cylinders 23FR through 23RL, each incorporated in a brake disk 22 and a brake caliper, respectively. The wheel cylinders 23FR through 23RL are connected to the hydraulic pressure actuator 40, each via a different flow channel. In the following, the wheel cylinders 23FR through 23RL are generically referred to as a "wheel cylinder 23." As described above, the hydraulic pressure actuator 40 functions as a pressure control mechanism that switches the flow channel of a brake fluid supplied by at least either the master cylinder unit 10 or the hydraulic power source 30 and controls the hydraulic pressure of the brake fluid transmitted to the wheel cylinder 23. The hydraulic pressure actuator 40 is provided with a plurality of control valves and hydraulic pressure sensors for switching or blocking the flow channel. A detailed description will follow.

In the disk brake units 21FR through 21RL, when a brake fluid is supplied to the wheel cylinder 23 from the hydraulic pressure actuator 40, a brake pad that serves as a friction member is pressed onto the brake disk 22 that rotates along with the wheel. With this, braking force is applied on the respective wheels. The disk brake units 21FR through 21RL are used in the present embodiment. However, for example, other braking force application mechanisms may be used that include a wheel cylinder such as a drum brake.

The master cylinder unit 10 used in the present embodiment is a master cylinder with a hydraulic pressure booster and includes a hydraulic pressure booster 31, a master cylinder 32, a regulator 33, and a reservoir 34. The hydraulic pressure booster 31 is connected to the brake pedal 24 and pressurizes the brake fluid by amplifying a pedal effort applied to the brake pedal 24 and then transmitting the amplified pedal effort to the master cylinder 32. The pedal effort is amplified by supplying the brake fluid to the hydraulic pressure booster 31 from the hydraulic power source 30 via the regulator 33. The master cylinder 32 then generates master cylinder pressure having a predetermined booster ratio with respect to the pedal effort.

The reservoir 34 for storing the brake fluid is arranged above the master cylinder 32 and the regulator 33. The master cylinder 32 communicates with the reservoir 34 when the brake pedal 24 is released. On the other hand, the regulator 33 communicates with both the reservoir 34 and an accumulator 35 of the hydraulic power source 30. The regulator 33 generates hydraulic pressure having a predetermined ratio with respect to the master cylinder pressure by using the reservoir 34 as a low pressure source and the accumulator 35 as a high pressure source. The hydraulic pressure generated by the regulator 33 is hereinafter referred to as "regulator pressure."

The hydraulic power source 30 includes the accumulator 35 and a pump 36. The accumulator 35 converts the pressure energy of the brake fluid pressurized by the pump 36 to the pressure energy of a filler gas such as a nitrogen gas to, for example, about 14 to 22 MPa, and then stores the converted pressure energy. The pump 36 has a motor 36a as a drive power source. An inlet port thereof is connected to the reservoir 34 via a pump pipeline 78, and an outlet port thereof is connected to the accumulator 35. The accumulator 35 is also connected to a relief valve 35a provided in the master cylinder unit 10. When the pressure of the brake fluid in the accumulator 35 increases abnormally high and reaches, for example, about 25 MPa, the relief valve 35a is opened so as to return the high pressure brake fluid to the reservoir 34.

As described above, the brake control apparatus 20 has the master cylinder 32, the regulator 33, and the accumulator 35 as sources of the brake fluid supplied to the wheel cylinder 23. A master pipeline 37, a regulator pipeline 38, and an accumulator pipeline 39 are connected to the master cylinder 32, the regulator 33, and the accumulator 35, respectively. The master pipeline 37, the regulator pipeline 38, and the accumulator pipeline 39 are each connected to the hydraulic pressure actuator 40.

The hydraulic pressure actuator 40 includes an actuator block, in which a plurality of flow channels are formed as a hydraulic pressure circuit, and a plurality of electromagnetic control valves. The flow channels formed in the actuator block includes individual flow channels 41, 42, 43 and 44 and a main flow channel 45. The individual flow channels 41 through 44 are diverged from the main flow channel 45 and connected to the wheel cylinders 23FR, 23FL, 23RR, and 23RL of the corresponding disk brake units 21FR, 21FL, 21RR and 21RL, respectively. This allows each of the wheel cylinders 23 to communicate with the main flow channel 45.

ABS holding valves 51, 52, 53, and 54 are provided in the middle of the individual flow channels 41, 42, 43, and 44. The ABS holding valves 51 through 54 each have an ON/OFF controlled solenoid and a spring and are normally-opened type electromagnetic control valves that are opened when the solenoid is in a de-energized state. The ABS holding valves 51 through 54 in an opened state allow the brake fluid to flow bi-directionally. In other words, the ABS holding valves 51 through 54 in the opened state allow the brake fluid to flow to the respective wheel cylinders 23 from the main flow channel 45 as well as allowing the brake fluid to flow to the main flow channel 45 from the respective wheel cylinders 23. When the ABS holding valves 51 through 54 are closed by energization of the solenoid, the brake fluid is blocked from flowing through the individual flow channels 41 through 44.

Further, the wheel cylinders 23 are connected to a reservoir flow channel 55 via pressure-reducing flow channels 46, 47, 48, and 49 that are connected to the individual flow channels 41 through 44, respectively. ABS pressure-reducing valves 56, 57, 58, and 59 are provided in the middle of the pressure-reducing flow channels 46, 47, 48, and 49. The ABS pressure-reducing valves 56 through 59 each have an ON/OFF controlled solenoid and a spring and are normally-closed type electromagnetic control valves that are closed when the solenoid is in a de-energized state. When the ABS pressure-reducing valves 56 through 59 are in a closed state, the brake fluid is blocked from flowing through the pressure-reducing flow channels 46 through 49. When the ABS pressure-reducing valves 56 through 59 are opened by energization of the solenoid, the brake fluid is allowed to flow through the pressure-reducing flow channels 46 through 49 so that the brake fluid returns to the reservoir 34 from the wheel cylinders 23 via the pressure-reducing flow channels 46 through 49 and the reservoir flow channel 55. The reservoir flow channel 55 is connected to the reservoir 34 of the master cylinder unit 10 via a reservoir pipeline 77. As described above, the reservoir flow channel 55 and the reservoir pipeline 77 function as a returning flow channel formed so as to allow the brake fluid to return to the reservoir 34 from the wheel cylinders 23. The returning flow channel constitutes a drain circuit between the ABS pressure-reducing valves 56 through 59 and the reservoir 34. The reservoir 34 is connected to the drain circuit and is open to the atmosphere. Thus, the brake fluid pressure in the returning flow channel is equal to the atmospheric pressure when the ABS pressure-reducing valves 56 through 59 are open.

The main flow channel 45 has an isolation valve 60 in the middle thereof. The isolation valve 60 divides the main flow channel 45 into a first flow channel 45a connected to the individual flow channels 41 and 42 and a second flow channel 45b connected to the individual flow channels 43 and 44. The first flow channel 45a is connected to the wheel cylinders 23FR and 23FL of the front wheels via the individual flow channels 41 and 42, and the second flow channel 45b is connected to the wheel cylinders 23RR and 23RL of the rear wheels via the individual flow channels 43 and 44.

The isolation valve 60 has an ON/OFF controlled solenoid and a spring and is a normally-closed type electromagnetic control valve that is closed when the solenoid is in a de-energized state. When the isolation valve 60 is in a closed state, the brake fluid is blocked from flowing through the main flow channel 45. When the isolation valve 60 is opened by energization of the solenoid, the brake fluid is allowed to flow bi-directionally between the first flow channel 45a and the second flow channel 45b. In other words, the isolation valve 60 allows the flow of the brake fluid to be controlled between the first flow channel 45a and the second flow channel 45b.

In the hydraulic pressure actuator 40, a master flow channel 61 and a regulator flow channel 62 that communicate with the main flow channel 45 are also formed. More specifically, the master flow channel 61 is connected to the first flow channel 45a of the main flow channel 45, and the regulator flow channel 62 is connected to the second flow channel 45b of the main flow channel 45. The master flow channel 61 is also connected to the master pipeline 37 that communicates with the master cylinder 32. The regulator flow channel 62 is also connected to the regulator pipeline 38 that communicates with the regulator 33.

The master flow channel 61 has a master cut valve 64 in the middle thereof. The master cut valve 64 has an ON/OFF controlled solenoid and a spring and is a normally-opened type electromagnetic control valve that is opened when the solenoid is in a de-energized state. When the master cut valve 64 is in an opened state, the brake fluid is allowed to flow bi-directionally between the master cylinder 32 and the first flow channel 45a of the main flow channel 45. When the master cut valve 64 is closed by energization of the solenoid, the brake fluid is blocked from flowing through the master flow channel 61.

A stroke simulator 69 is connected to the master flow channel 61 via a simulator cut valve 68 on an upstream side of the master cut valve 64. In other words, the simulator cut valve 68 is provided in a flow channel that connects the master cylinder 32 and the stroke simulator 69. The simulator cut valve 68 has an ON/OFF controlled solenoid and a spring and is a normally-closed type electromagnetic control valve that is closed when the solenoid is in a de-energized state. When the simulator cut valve 68 is in a closed state, the brake fluid is blocked from flowing between the main flow channel 61 and the stroke simulator 69. When the simulator cut valve 68 is opened by energization of the solenoid, the brake fluid is allowed to flow bi-directionally between the master cylinder 32 and the stroke simulator 69.

The stroke simulator 69 includes a plurality of pistons and springs. When the simulator cut valve 68 is opened, the stroke simulator 69 generates a reaction force, which corresponds to the pedal effort of the brake pedal 24 applied by a driver, by using the brake fluid delivered from the master cylinder unit 10. A stroke simulator having multi-stage spring characteristics is preferably employed as the stroke simulator 69 in order for the driver to have an improved brake operation feeling. The stroke simulator 69 of the present embodiment has multi-stage spring characteristics.

The regulator flow channel 62 has a regulator cut valve 65 in the middle thereof. The regulator cut valve 65 has an ON/OFF controlled solenoid and a spring and is a normally-opened type electromagnetic control valve that is opened when the solenoid is in a de-energized state. The regulator cut valve 65 in an opened state allows the brake fluid to flow bi-directionally between the regulator 33 and the second flow channel 45b of the main flow channel 45. When the regulator cut valve 65 is closed by energization of the solenoid, the brake fluid is blocked from flowing through the regulator flow channel 62.

In the present embodiment, the master cylinder 32 of the master cylinder unit 10 communicates with the wheel cylinders 23FR and 23FL of the front wheels via the first hydraulic pressure circuit configured to include the following components. The first hydraulic pressure circuit is configured to include the master pipeline 37, the master flow channel 61, the first flow channel 45a of the main flow channel 45, the individual flow channels 41 and 42, and the like so that the hydraulic pressure of the brake fluid in the master cylinder unit 10 is transmitted to the wheel cylinders 23FR and 23FL of the front wheels. The master pipeline 37, the master flow channel 61, the first flow channel 45a of the main flow channel 45, and the individual flow channels 41 and 42 form a pressure-increasing flow channel of the first hydraulic pressure circuit. The hydraulic pressure booster 31 and the regulator 33 of the master cylinder unit 10 communicates with the wheel cylinders 23RR and 23RL of the rear wheels via the second hydraulic pressure circuit configured to include the following components. The second hydraulic pressure circuit is configured to include the regulator pipeline 38, the regulator flow channel 62, the second flow channel 45b of the main flow channel 45, the individual flow channels 43 and 44, and the like so that the hydraulic pressure of the brake fluid in the master cylinder unit 10 is transmitted to the wheel cylinders 23RR and 23RL of the rear wheels. The regulator pipeline 38, the regulator flow channel 62, the second flow channel 45b of the main flow channel 45, and the individual flow channels 43 and 44 form a pressure-increasing flow channel of the second hydraulic pressure circuit.

Therefore, the hydraulic pressure in the master cylinder unit 10 pressurized in accordance with the amount of the brake operation by the driver is transmitted to the wheel cylinders 23FR and 23FL of the front wheels via the first hydraulic pressure circuit. To the wheel cylinders 23RR and 23RL of the rear wheels, the hydraulic pressure in the master cylinder unit 10 is transmitted via the second hydraulic pressure circuit. This allows braking force that corresponds to the amount of the brake operation by the driver to be generated at the respective wheel cylinders 23. In other words, the wheel cylinders 23 are capable of exerting braking force on respective wheels when the brake fluid is supplied.

In addition to the master flow channel 61 and the regulator flow channel 62, an accumulator flow channel 63 is also formed in the hydraulic pressure actuator. One end of the accumulator flow channel 63 is connected to the second flow channel 45b of the main flow channel 45, and the other end thereof is connected to the accumulator pipeline 39 communicating with the accumulator 35.

The accumulator flow channel 63 has a pressure-increasing linear control valve 66 in the middle thereof. The accumulator flow channel 63 and the second flow channel 45b of the main flow channel 45 are connected to the reservoir flow channel 55 via a pressure-reducing linear control valve 67. The pressure-increasing linear control valve 66 and the pressure-reducing linear control valve 67 each have a linear solenoid and a spring and are both normally-closed electromagnetic control valves that are closed when the solenoid is in a de-energized state. Thus, being different from an ON/OFF control valve such as the master cut valve 64 and regulator cut valve 65 for performing an on/off action, the degree of a valve opening is adjusted for the pressure-increasing linear control valve 66 and the pressure-reducing linear control valve 67 in accordance with the electrical current supplied to the respective solenoids.

The pressure-increasing linear control valve 66 is provided as a common pressure-increasing control valve to the respective wheel cylinders 23 provided corresponding to the wheels. Similarly, the pressure-reducing linear control valve 67 is provided as a common pressure-reducing control valve to the respective wheel cylinders 23. In other words, the pressure-increasing linear control valve 66 and the pressure-reducing linear control valve 67 are provided as a pair of common control valves for controlling the feeding and discharging of the brake fluid fed from the hydraulic power source 30 to/from the respective wheel cylinders 23, in the present embodiment.

The differential pressure between inlet and outlet ports of the pressure-increasing linear control valve 66 corresponds to the differential pressure between the pressure of the brake fluid in the accumulator 35 and the pressure of the brake fluid in the main flow channel 45. The differential pressure between inlet and outlet ports of the pressure-reducing linear control valve 67 corresponds to the differential pressure between the pressure of the brake fluid in the main flow channel 45 and the pressure of the brake fluid in the reservoir 34. A relationship of $F1+F3=F2$ is established when: an electromagnetic driving force according to the electric power supplied to the linear solenoids of the pressure-increasing linear control valve 66 and the pressure-reducing linear control valve 67 is set to be F1; a biasing force of the springs is set to be F2; and a differential pressure acting force according to the differential pressure between the inlet and outlet ports of the pressure-increasing linear control valve 66 and the pressure-reducing linear control valve 67 is set to be F3. Therefore, it is possible to control the differential pressure between the inlet and outlet ports of the pressure-increasing linear control valve 66 and the pressure-reducing linear control valve 67 by continuously controlling the electric power supply to the linear solenoids of the linear control valves 66 and 67.

The hydraulic power source 30 can feed the brake fluid, which is pressurized by the supply of power, independently from the operation of the brake pedal 24. The hydraulic power source 30 communicates with the respective wheel cylinders 23 of the front wheels and the rear wheels via a third hydraulic pressure circuit configured to include the following components. The third hydraulic pressure circuit is configured to include the accumulator pipeline 39, the accumulator flow channel 63, the main flow channel 45, and the individual flow channels 41 and 44, and the like so that the hydraulic pressure of the brake fluid in the hydraulic power source 30 is transmitted to the respective wheel cylinders 23. The accumulator pipeline 39, the accumulator flow channel 63, the main flow channel 45, and the individual flow channels 41 through 44 form a pressure-increasing flow channel of the third hydraulic pressure circuit.

The hydraulic pressure actuator 40 is configured to include, as well as the previously-described flow channels formed therein, components such as the ABS holding valves 51 through 54, the ABS pressure-reducing valves 56 through 59, the isolation valve 60, the master cut valve 64, the regulator cut valve 65, the pressure-increasing linear control valve 66, the pressure-reducing linear control valve 67, the simulator cut valve 68, the regulator pressure sensor 71, the accumulator pressure sensor 72, the control pressure sensor 73, etc. Based on a control signal from the brake ECU 70, the hydraulic pressure actuator 40 switches the flow channel of the brake fluid supplied by at least either the master cylinder unit 10 or the hydraulic power source 30 and controls the hydraulic pressure of the brake fluid transmitted to the respective wheel cylinders 23.

The hydraulic pressure actuator 40 can control the hydraulic pressure in the wheel cylinders 23RR and 23RL of the rear wheels regardless of the opening and closing of the isolation valve 60 since the second flow channel 45b of the main flow channel 45 communicates in between the pressure-increasing linear control valve 66 and the pressure-reducing linear control valve 67. When the isolation valve 60 is in an opened state, the hydraulic pressure in all the wheel cylinders 23 can be controlled by the hydraulic pressure actuator 40 by using the hydraulic pressure of the brake fluid in the hydraulic power source 30.

In the brake control apparatus 20, the hydraulic power source 30 and the hydraulic pressure actuator 40 are controlled by the brake ECU 70. The brake ECU 70 is formed as a microprocessor including a CPU and is provided with a ROM for storing various programs, a RAM for temporarily storing data, input/output ports, communication ports, etc., in addition to the CPU. The brake ECU 70 is capable of communicating with a highly-ranked hybrid ECU (not shown). The brake ECU 70 is also capable of performing regenerative brake coordination control by controlling the pump 36 of the hydraulic power source 30 and the electromagnetic control valves 51 through 54, 56 through 59, 60, and 64 through 68 of the hydraulic pressure actuator 40 based on control signals from the hybrid ECU and signals from various sensors.

A regulator pressure sensor 71, an accumulator pressure sensor 72, and a control pressure sensor 73 are connected to the brake ECU 70. The regulator pressure sensor 71 detects the pressure of the brake fluid inside the regulator flow channel 62, i.e., the regulator pressure, on the upstream side of the regulator cut valve 65 and then provides a signal indicating the detected value to the brake ECU 70. The accumulator pressure sensor 72 detects the pressure of the brake fluid inside the accumulator flow channel 63, i.e., the accumulator pressure, on the upstream side of the pressure-increasing linear control valve 66 and then provides a signal indicating the detected value to the brake ECU 70. The control pressure sensor 73 detects the pressure of the brake fluid inside the first flow channel 45a of the main flow channel 45 located on one side from the isolation valve 60 and then provides a signal indicating the detected value to the brake ECU 70. The respective detected values of the regulator pressure sensor 71, the accumulator pressure sensor 72, and the control pressure sensor 73 are sequentially provided to the brake ECU 70 every predetermined time interval and stored in a predetermined storage region of the brake ECU 70 for every predetermined amount. In the present embodiment, the regulator pressure sensor 71, the accumulator pressure sensor 72, and the control pressure sensor 73 each have a self-diagnosis function and are capable of detecting if there is any problems inside the respective sensors for the respective sensors so as to transmit a signal indicating whether there is any problems to the brake ECU 70.

When the isolation valve 60 is in the opened state where the first flow channel 45a and second flow channel 45b of the main flow channel 45 communicate with each other, the output value of the control pressure sensor 73 indicates the lower side hydraulic pressure of the pressure-increasing linear control valve 66 and the higher side hydraulic pressure of the pressure-reducing linear control valve 67. Therefore, the output value can be used to control the pressure-increasing linear control valve 66 and the pressure-reducing linear control valve 67. When the pressure-increasing linear control valve 66 and the pressure-reducing linear control valve 67 are being closed while the master cut valve 64 is in the opened state, the output value of the control pressure sensor 73 indicates the master cylinder pressure. Furthermore, when the isolation valve 60 is opened such that the first flow channel 45a and second flow channel 45b of the main flow channel 45 communicate with each other while the ABS holding valves 51 through 54 are opened with the ABS pressure-reducing valves 56 through 59 are being closed, the output value of the control pressure sensor 73 indicates the brake fluid pressure acting on the respective wheel cylinders 23, i.e., the wheel cylinder pressure.

Furthermore, a stroke sensor 25 provided in the brake pedal 24 is also connected to the brake ECU 70. The stroke sensor 25 detects a pedal stroke as an operation amount of the brake pedal 24 and then provides a signal that indicates the detected value to the brake ECU 70. The output values of the stroke sensor 25 are sequentially provided to the brake ECU 70 every predetermined time interval and stored in a specified storage region of the brake ECU 70 for every predetermined amount. A brake operating state detection means other than the stroke sensor 25 may be added to the stroke sensor 25 or may be provided instead of the stroke sensor 25 so that the brake operating state detection means is connected to the brake ECU 70. A pedal effort sensor for detecting the operation force applied to the brake pedal 24, a brake switch for detecting the depression of the brake pedal 24, and the like are examples of the brake operating state detection means.

The brake control apparatus 20 configured as described above can operate in at least two modes: a regenerative coordination control mode; and a hydro-booster mode for backup (hereinafter, often referred to as an "HB mode"). During the normal running time, the brake control apparatus 20 controls the braking force in the regenerative coordination control mode. The brake control apparatus 20 controls the braking force in the hydro-booster mode when any problem is detected in the brake control apparatus 20, for example, a problem that is related to brake fluid pressure (hereinafter, also referred to as "hydraulic pressure") and, more specifically, a problem of not being able to control the brake fluid pressure.

The hydro-booster mode is a control mode where a distribution channel is ensured for the brake fluid to flow from the master cylinder 32 to the wheel cylinder 23 such that braking force is mechanically generated in accordance with an operation input applied to the brake operation member. In principle, the brake ECU 70 stops all the supply of the control current to the respective electromagnetic control valves in the hydro-booster mode. Therefore, the master cut valve 64 and regulator cut valve 65, that are normally-opened type, are opened, and the isolation valve 60 and simulator cut valve 68, that are normally-closed type, are closed. The control of the pressure-increasing linear control valve 66 and the pressure-reducing linear control valve 67 is stopped, and the valves 66 and 67 are closed.

As a result, a brake fluid supply route is separated into two systems: the first hydraulic pressure circuit; and the second hydraulic pressure circuit. The master cylinder pressure is transmitted to the wheel cylinders 23FR and 23FL for front wheels, and the regulator pressure is transmitted to the wheel cylinders 23RR and 23RL for rear wheels. The destination of the brake fluid transmitted from the master cylinder 32 is switched from the stroke simulator 69 to the wheel cylinders 23FR and 23FL for front wheels. Since the hydraulic pressure booster 31 is a mechanism that mechanically amplifies the pedal effort, the hydraulic pressure booster 31 continues to function even when the supply of the control current to the respective electromagnetic control valves is stopped when the mode is changed to the hydro-booster mode. The hydro-booster mode is excellent in fail-safety in that braking force can be generated by means of a hydraulic pressure booster.

In any of the above cases, the brake control apparatus 20 starts a braking operation upon reception of a braking request. The braking request occurs when a braking force needs to be exerted on a vehicle. The braking request occurs, for example, when the brake pedal 24 is operated by a driver or when a distance from another vehicle becomes shorter than a predetermined distance during automatic control of the distance from said another vehicle while driving.

Figure 2:
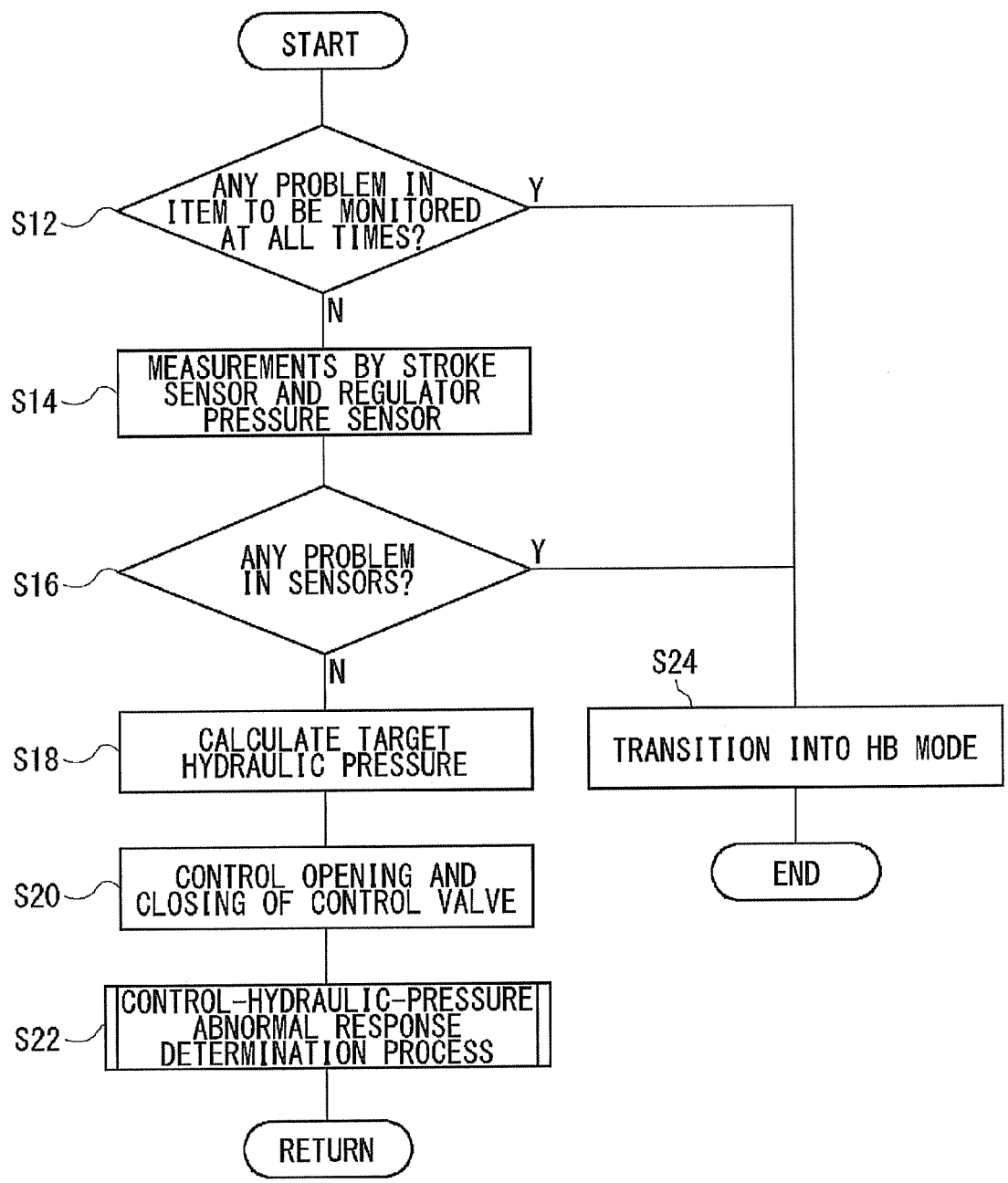
FIG. 2 is a flowchart illustrating a control process in a regenerative coordination control mode.

FIG. 2 is a flowchart illustrating a control process in a regenerative coordination control mode. During the regenerative coordination control mode, regenerative brake coordination control is performed. The process shown in FIG. 2 is repeatedly performed for every predetermined cycle, for example, for every several msec or so, after the braking request is generated by the operation of the brake pedal 24.

When the control process starts in the regenerative coordination control mode, the brake ECU 70 first determines whether or not there is a problem in an item to be monitored at all times (S12). The item to be monitored at all times includes, for example, if there is a disconnection or short of the internal wiring of the brake control apparatus 20 and if there is a problem in the hydraulic power source 30 based on a measurement value of the accumulator pressure sensor 72. The item to be monitored at all times is set to detect a problem of not being able to control the brake fluid pressure so as to determine the properness of performing or continuing the regenerative coordination control mode.

When it is determined that there is a problem in the item to be monitored at all times (Y in S12), the brake ECU 70 changes the control mode from the regenerative coordination control mode to the hydro-booster (HB) mode and then discontinues the regenerative brake coordination control (S24). On the other hand, when it is determined that there is no problem in the item to be monitored at all times (N in S12), the brake ECU 70 acquires measurement values taken by the stroke sensor 25 and the regulator pressure sensor 71 (S14). The operation amount of the brake pedal 24 is detected by the stroke sensor 25, and the hydraulic pressure inside the master cylinder unit 10, which is pressurized in accordance with the depression of the brake pedal 24, is measured by the regulator pressure sensor 71.

The brake ECU 70 then determines whether or not there is a problem in the stroke sensor 25 and the regulator pressure sensor 71 based on the measurement values of the stroke sensor 25 and the regulator pressure sensor 71 (S16). A problem in the stroke sensor 25 and/or the regulator pressure sensor 71 interferes with the calculation of target hydraulic pressure. Thus, whether there is a sensor problem that is related to the calculation of the brake fluid pressure is determined in S16. In the present embodiment, two systems of the stroke sensor 25 are provided in parallel, and the brake ECU 70 compares measurement values of the two stroke sensors 25 with a measurement value of the regulator pressure sensor 71 and then determines whether or not there is a sensor that shows an abnormal measurement value. When there is a sensor that shows an abnormal measurement value that is different from those of the other two sensors, the brake ECU 70 determines that there is a problem in the sensor that is showing the abnormal measurement value. When it is determined that there is a problem in any of the sensors (Y in S16), the brake ECU 70 changes the control mode from the regenerative coordination control mode to the HB mode and then stops the regenerative brake coordination control (S24).

When it is determined that there is no problem in the stroke sensors 25 and the regulator pressure sensor 71 (N in S16), the brake ECU 70 calculates the target hydraulic pressure in the wheel cylinders 23 (S18). The brake ECU 70 first deducts a regenerative braking force from the required total braking force to calculate a required hydraulic pressure braking force, which is a braking force to be generated by the brake control apparatus 20. The regenerative braking force is supplied from the hybrid ECU to the brake control apparatus 20 at this time. The brake ECU 70 calculates the target hydraulic pressure in the wheel cylinders 23 based on the required hydraulic pressure braking force that is calculated.

While the vehicle is running, the brake ECU 70 brings the master cut valve 64 and the regulator cut valve 65 into a closed state, while bringing the isolation valve 60 and the simulator cut valve 68 into an opened state, and controls the pressure-increasing linear control valve 66 and the pressure-reducing linear control valve 67 in accordance with the target hydraulic pressure (S20). This allows the wheel cylinders 23 to be cut off from the master cylinder unit 10 and to receive the brake fluid supply from the hydraulic power source 30. The brake fluid fed from the master cylinder 32 by the driver's brake operation is supplied to the stroke simulator 69, and a reaction force corresponding to the pedal effort of the brake pedal 24 applied by a driver is then generated so that the good brake operation feeling of the driver is maintained. More specifically, the pressure-increasing linear control valve 66 and the pressure-reducing linear control valve 67 are controlled by controlling the electric current supplied to both control valves so as to adjust the opening degree of the control valves.

Then, the brake ECU 70 performs a control-hydraulic-pressure abnormal response determination process of determining whether or not the hydraulic pressure in the wheel cylinders 23 is controlled normally (S22). In other words, whether or not the wheel cylinder pressure is being controlled normally is determined based on the measurement value measured by the control pressure sensor 73 in the control-hydraulic-pressure abnormal response determination process S22. Processes shown in FIG. 2 are ended, when the control-hydraulic-pressure abnormal response determination process S22 is completed, and are performed again in the same way when the time comes for the processes to be performed.

In the control-hydraulic-pressure abnormal response determination process S22, the determination is made regarding a problem of not being able to control the brake fluid pressure, and more specifically, it is determined whether there are any of three problems: an accelerated-response problem; a delayed-response problem; and control trouble. The accelerated-response problem indicates a state where the control hydraulic pressure increases drastically exceeding the target hydraulic pressure due to opening failure or a leakage problem in the pressure-increasing linear control valve 66 or due to failure in linearly controlling the degree of the opening of the control valve. The delayed-response problem indicates a state where a rise in the control hydraulic pressure is overly delayed due to closing failure or inadequate flow in the pressure-increasing linear control valve 66. The control trouble indicates a state where the control hydraulic pressure is not following the target hydraulic pressure. For example, a state where deviation between the target hydraulic pressure and the control hydraulic pressure exceeds standard deviation continues over a predetermined determination standard time period. The opening failure indicates an abnormal state where the valve cannot be closed and stays open when the valve needs to be closed, and the closing failure indicates an abnormal state where the valve cannot be opened and stays closed when the valve needs to be opened.

In the present embodiment, fail safe is established for when there is failure in a pipeline that forms the second hydraulic pressure circuit, e.g., the individual flow channels 43 and 44. When a break or crack occurs in the individual flow channel 43 or 44, leakage of the brake fluid occurs such that sufficient hydraulic pressure cannot be supplied to the wheel cylinders 23RR and 23RL of the rear wheels. Therefore, it is determined that the delayed-response problem has generated in this case.

Figure 3:
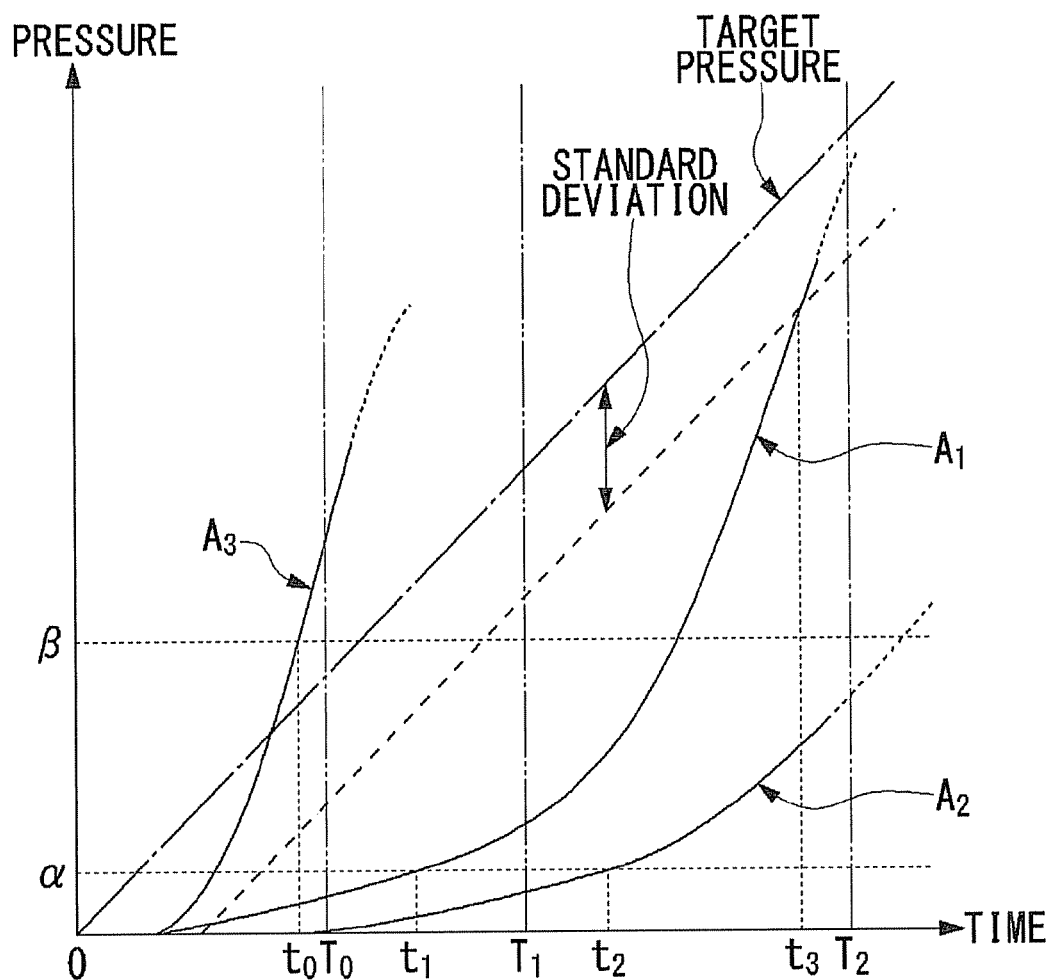
FIG. 3 is a diagram illustrating control hydraulic pressure that acts on a wheel cylinder after a braking request has occurred.

FIG. 3 is a diagram illustrating control hydraulic pressure that acts on a wheel cylinder after a braking request has occurred. The vertical axis represents differential pressure from the atmospheric pressure, and the horizontal axis represents time elapsed since the generation of the braking request. FIG. 3 shows an initial control-hydraulic-pressure response immediately after the generation of the braking request and shows an example for each of the following responses: an initial response $A_1$ obtained under a normal situation; an initial response $A_2$ obtained in the case of a delayed-response problem; and an initial response $A_3$ obtained in the case of an accelerated-response problem. The target hydraulic pressure is shown in an alternate long and short dash line in FIG. 3 and increases over time after the generation of the braking request. In FIG. 3, the target hydraulic pressure increases in a linear fashion; however, this is merely an example. Reference pressure α for determining response delay and reference pressure β for determining response acceleration are shown by dotted lines, and reference time $T_0$ for determining response acceleration, reference time $T_1$ for determining response delay, and reference time $T_2$ for determining control trouble are shown by two-dot chain lines.

The value of the normal initial response $A_1$ reaches the reference pressure α for determining response delay before the reference time $T_1$ for determining response delay elapses, more specifically, when time $t_1$ has elapsed after the generation of the braking request. The normal initial response $A_1$ continues to increase at and after the time $t_1$ such that the value thereof exceeds the reference pressure a for determining response delay at the reference time $T_1$ for determining response delay. As described above, when the control hydraulic pressure reaches the reference pressure a for determining response delay before the reference time $T_1$ for determining response delay elapses, it is not determined that there is the delayed-response problem.

The control hydraulic pressure is measured by the control pressure sensor 73. The reference pressure a for determining response delay is set in advance as a threshold value for determining the rise in the control hydraulic pressure and stored in the brake ECU 70. The reference pressure a for determining response delay is set to be, for example, about 0.5-1.0 MPa in the present embodiment. The reference time $T_1$ for determining response delay is set in advance as a threshold value for checking for a delayed-response problem of the control hydraulic pressure and stored in the brake ECU 70. The reference time $T_1$ for determining response delay is counted from the point, at which the braking request is generated, and set to expire before the after-mentioned reference time $T_2$ for determining control trouble expires. The reference time $T_1$ for determining response delay and the reference pressure a for determining response delay are desirably determined as appropriate by experiments, etc.

Furthermore, the deviation of the normal initial response $A_1$ from the target hydraulic pressure becomes less than the standard deviation when the time $t_3$ has elapsed, and the normal initial response $A_1$ then follows the target hydraulic pressure after that. In other words, the deviation of the normal initial response $A_1$ from the target hydraulic pressure when the reference time $T_2$ for determining control trouble has elapsed is smaller than the standard deviation. As described above, when the deviation from the target hydraulic pressure becomes less than the standard deviation before the reference time $T_2$ for determining control trouble elapses, it is not determined that there is control trouble.

The standard deviation may be set to be a constant value or may be set to account for a predetermined percentage of the target hydraulic pressure. In the present embodiment, the standard deviation is set to be a constant value, for example, 1 MPa. The reference time $T_2$ for determining control trouble is set in advance as a threshold value for checking for control trouble of the control hydraulic pressure and stored in the brake ECU 70.

On the other hand, the value of the initial response $A_2$ obtained in the case of a delayed-response problem reaches the reference pressure a for determining response delay when time $t_2$ has elapsed after the generation of the braking request. The time $t_2$ comes after the reference time $T_1$ for determining response delay has elapsed, and the value of the initial response $A_2$ does not reach the reference pressure a for determining response delay at the reference time $T_1$ for determining response delay. In such a case, it is determined that the delayed-response problem has been generated.

The value of the initial response $A_3$ obtained in the case of an accelerated-response problem exceeds the target hydraulic pressure and reaches the reference pressure $\beta$ for determining response acceleration when time $t_0$ has elapsed after the generation of the braking request. The control hydraulic pressure continues to increase, and the value exceeds the reference pressure $\beta$ for determining response acceleration also at the reference time $T_0$ for determining response acceleration. When the control hydraulic pressure increases suddenly as described above such that the control hydraulic pressure is more than the reference pressure $\beta$ for determining response acceleration at the reference time $T_0$ for determining response acceleration, it is determined that the accelerated-response problem has been generated.

The reference pressure $\beta$ for determining response acceleration is preferably set to be a value that is larger than the target hydraulic pressure obtained at the reference time $T_0$ for determining response acceleration, and is set to be, for example, about 3-4 MPa. This is because it is considered acceptable to determine that there is the accelerated-response problem if the control hydraulic pressure exceeds the target hydraulic pressure at the reference time $T_0$ for determining response acceleration, since a situation is rare where the control hydraulic pressure exceeds the target hydraulic pressure immediately after the generation of a control request. The reference time $T_0$ for determining response acceleration is set to be before the reference time $T_1$ for determining response delay. This allows the accelerated-response problem to be detected before the delayed-response problem. Thus, generation of the braking force that exceeds the requested braking force can be prevented more promptly.

Figure 4:
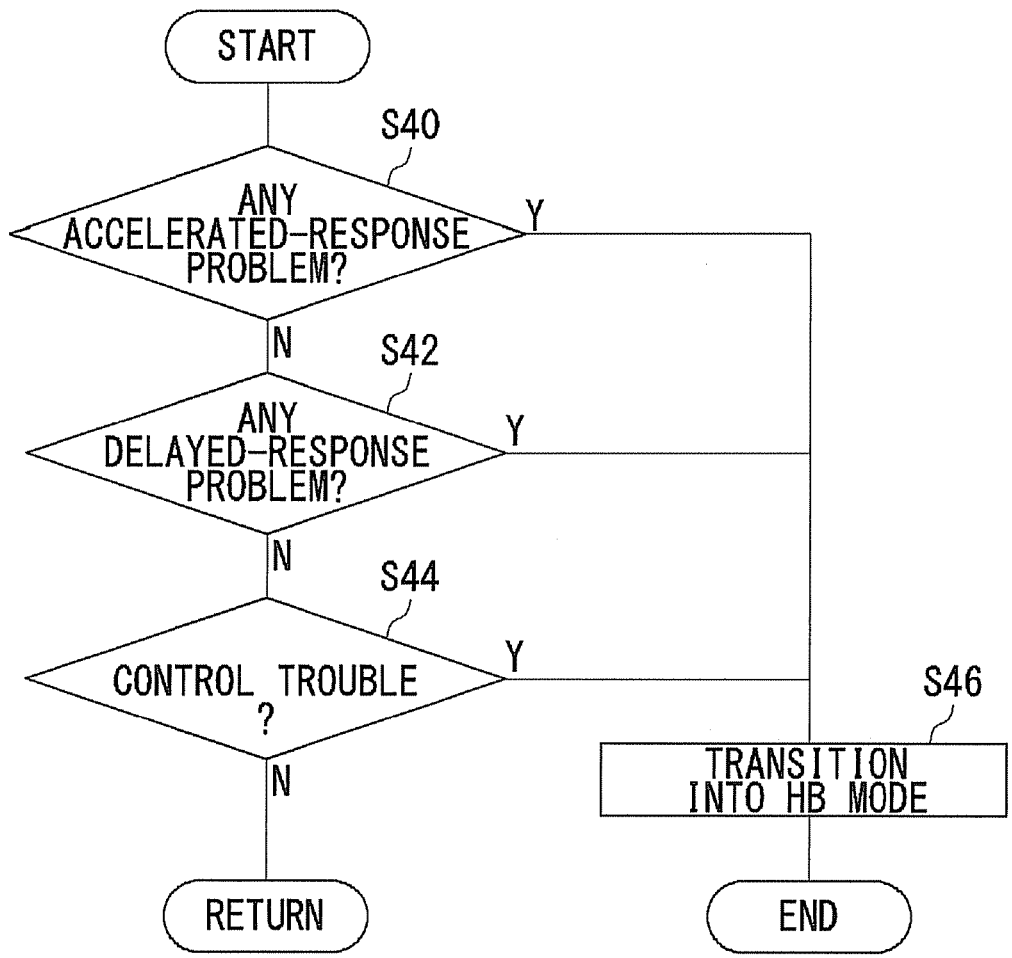
FIG. 4 is a flowchart illustrating a control-hydraulic-pressure abnormal response determination process 522.

FIG. 4 is a flowchart illustrating the control-hydraulic-pressure abnormal response determination process S22. When the control-hydraulic-pressure abnormal response determination process S22 is started, the brake ECU 70 first determines whether or not there is the accelerated-response problem (S40). In other words, the brake ECU 70 determines whether or not the control hydraulic pressure exceeds the reference pressure $\beta$ for determining response acceleration, after the generation of the braking request and before the reference time $T_0$ for determining response acceleration elapses. When it is determined that the control hydraulic pressure has not reached the reference pressure $\beta$ for determining response acceleration, the brake ECU 70 determines that there is no accelerated-response problem being generated (N in S40) and proceeds with the determination of the delayed-response problem (S42). When it is determined that the control hydraulic pressure has exceeded the reference pressure $\beta$ for determining response acceleration, the brake ECU 70 determines that the accelerated-response problem has been generated (Y in S40). When there is the accelerated-response problem that has been generated, the brake ECU 70 stops the regenerative brake coordination control so as to enter into the hydro-booster mode (S46) and ends the control-hydraulic-pressure abnormal response determination process S22.

The brake ECU 70 determines whether or not there is the delayed-response problem (S42). In other words, the brake ECU 70 determines whether or not the control hydraulic pressure reaches the reference pressure a for determining response delay, after the generation of the braking request and before the reference time $T_1$ for determining response delay elapses. When it is determined that the control hydraulic pressure has reached the reference pressure a for determining response delay before the reference time $T_1$ for determining response delay elapses, the brake ECU 70 determines that there is no delayed-response problem being generated (N in S42) and proceeds with checking for the control trouble (S44). When it is determined that the control hydraulic pressure has not reached the reference pressure a for determining response delay even after the reference time $T_1$ for determining response delay has elapsed, the brake ECU 70 determines that the delayed-response problem has been generated (Y in S42). When there is the delayed-response problem that has been generated, the brake ECU 70 stops the regenerative brake coordination control so as to enter into the hydro-booster mode (S46) and ends the control-hydraulic-pressure abnormal response determination process S22.

The brake ECU 70 determines whether or not there is the control trouble (S44). In other words, the brake ECU 70 determines whether or not the deviation calculated from the target hydraulic pressure and the control hydraulic pressure is less than the standard deviation before the reference time $T_2$ for determining control trouble elapses. When it is determined that the deviation is less than the standard deviation before the reference time $T_2$ for determining control trouble elapses, the brake ECU 70 determines that there is no control trouble being generated (N in S44) and goes back to the process shown in FIG. 2. When it is determined that the deviation of the control hydraulic pressure exceeds the standard deviation even after the reference time $T_2$ for determining control trouble elapses, the brake ECU 70 determines that the control trouble has been generated (Y in S44). When there is the control trouble that has been generated, the brake ECU 70 stops the regenerative brake coordination control so as to enter into the hydro-booster mode (S46) and ends the control-hydraulic-pressure abnormal response determination process S22.

Figure 5:
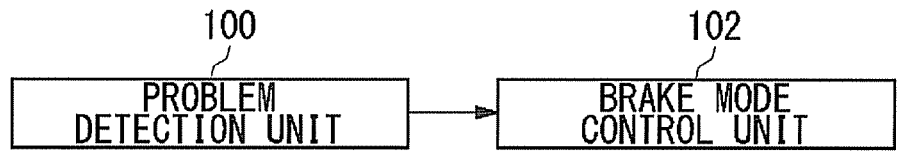
FIG. 5 is a diagram illustrating the configuration of a brake ECU that determines a brake mode.

FIG. 5 illustrates the configuration of the brake ECU 70 that determines a brake control mode. The brake ECU 70 is provided with a problem detection unit 100 and a brake mode control unit 102 so as to determine the brake control mode. The problem detection unit 100 detects a problem related to the brake fluid pressure. The problem related to the brake fluid pressure includes generation of trouble in a sensor or wiring that is necessary for performing the regenerative brake coordination control, as described regarding FIG. 2, or generation of a response problem of the hydraulic pressure, as described regarding FIG. 4. Thus, the problem related to the brake fluid pressure shows a problem of not being able to control the brake fluid pressure. In other words, the problem detection unit 100 detects the problem related to the brake fluid pressure by performing the determination processes in S12 and S14 shown in FIG. 2 and by performing the determination processes in S40, S42, and S44 shown in FIG. 4, in the present embodiment.

When the problem related to the brake fluid pressure is detected by the problem detection unit 100, the brake mode control unit 102 stops the regenerative brake coordination control and changes the brake control mode to the hydro-booster mode. The brake mode control unit 102 stops all the supply of the control current to the respective electromagnetic control valves and performs the brake control in the hydro-booster mode. Therefore, the normally-opened type master cut valve 64 and regulator cut valve 65 are opened, and the normally-closed type isolation valve 60 and simulator cut valve 68 are closed. The controlling of the pressure-increasing linear control valve 66 and the pressure-reducing linear control valve 67 is stopped, and the valves 66 and 67 are closed.

In a regenerative brake coordination control mode of the present embodiment, the feeding of the brake fluid to the wheel cylinders 23 of the respective wheels is controlled by a pair of the pressure-increasing linear control valve 66 and the pressure-reducing linear control valve 67; as described, the pressure-increasing linear control valve 66 and the pressure-reducing linear control valve 67 are used in common for the wheel cylinders 23. Therefore, the use of the pressure-increasing linear control valve 66 and the pressure-reducing linear control valve 67 in common for the respective wheel cylinders 23 is more desirable in view of cost reduction than use of separate control valves provided in each of the wheel cylinders 23. However, the use of the pressure-increasing linear control valve 66 and the like in common increases the volume to be supplied with respect to the supply flow volume. Thus, the delay time for the rise in the control hydraulic pressure becomes longer. In the present embodiment, the delay in response is determined in two stages such as the delayed-response problem and the control trouble described above. This allows for prompt detection of undue delay of response due to a problem of not being able to control the brake fluid pressure, for example, a leakage problem due to the failure of a pipeline or a problem such as closing failure of the pressure-increasing linear control valve 66. Therefore, this allows the mode to be immediately changed to the hydro-booster mode in the case of a problem so as to promptly overcome shortage of the braking force.

As described above, the brake fluid fed from the hydraulic power source 30 is supplied to the wheel cylinders 23 via the pressure-increasing linear control valve 66, allowing the braking force to be exerted on the wheels in the regenerative coordination control mode. The brake fluid is drained from the wheel cylinders 23 via the pressure-reducing linear control valve 67, if necessary, so as to control the braking force exerted on the wheels.

On the other hand, the hydraulic pressure in the master cylinder unit 10 pressurized in accordance with the amount of the brake operation by the driver is transmitted to the wheel cylinders 23 in the hydro-booster mode. In the hydro-booster mode, the brake ECU 70 brings the master cut valve 64 and the regulator cut valve 65 into an opened state while bringing the isolation valve 60 and the simulator cut valve 68 into a closed state. As a result, the master cylinder pressure is transmitted to the wheel cylinders 23FR and 23FL for front wheels via the first hydraulic pressure circuit, and the regulator pressure is transmitted to the wheel cylinders 23RR and 23RL for rear wheels via the second hydraulic pressure circuit, so that the braking force is exerted on the respective wheels.

As described above, the hydro-booster mode is used as a preliminary control mode for when the regenerative brake coordination control is not performed due to a reason such as generation of a problem, in the present embodiment. In the hydro-booster mode, the first hydraulic pressure circuit and the second hydraulic pressure circuit are separated by bringing the isolation valve 60 into a closed state. This is to allow the application of the braking force by means of a normal hydraulic pressure circuit even if another problem such as leakage from a pipeline occurs in either of the hydraulic, pressure circuits. The safety of the brake control apparatus 20 can be enhanced by providing the isolation valve 60 as described above.

As described above, the isolation valve 60 plays a role of separating the first hydraulic pressure circuit for a front wheel and the second hydraulic pressure circuit for a rear wheel in the hydro-booster mode. Thus, by providing the isolation valve 60, it is possible to supply the hydraulic pressure to the wheel cylinders 23 for front wheels via the first hydraulic pressure circuit even when the brake fluid of the second hydraulic pressure circuit leaks to the outside due to failure of a rear pipeline such as an individual flow channels 43 and 44. In the hydro-booster mode, the control pressure sensor 73 detects a brake fluid pressure Pfr of the first hydraulic pressure circuit, and the regulator pressure sensor 71 detects a brake fluid pressure Prr of the second hydraulic pressure circuit.

However, the isolation valve 60 is formed by a differential pressure valve that opens when the differential pressure across the isolation valve 60 becomes at least a predetermined value P1. The isolation valve 60 is brought to be in a closed state by a spring. Thus, the isolation valve 60 is opened when the differential pressure between the hydraulic pressure Pfr of the first flow channel 45a and the hydraulic pressure Prr of the second flow channel 45b exceeds automatic opening pressure P1 generated by the spring force (e.g., 9 MPa), the first flow channel 45a and the second flow channel 45b being obtained by separating the hydraulic pressure circuit into two systems. Accordingly, the brake fluid leaks from the first flow channel 45a on the high pressure side to the second flow channel 45b on the low pressure side. This phenomenon is now described in detail in the following.

Figure 6:
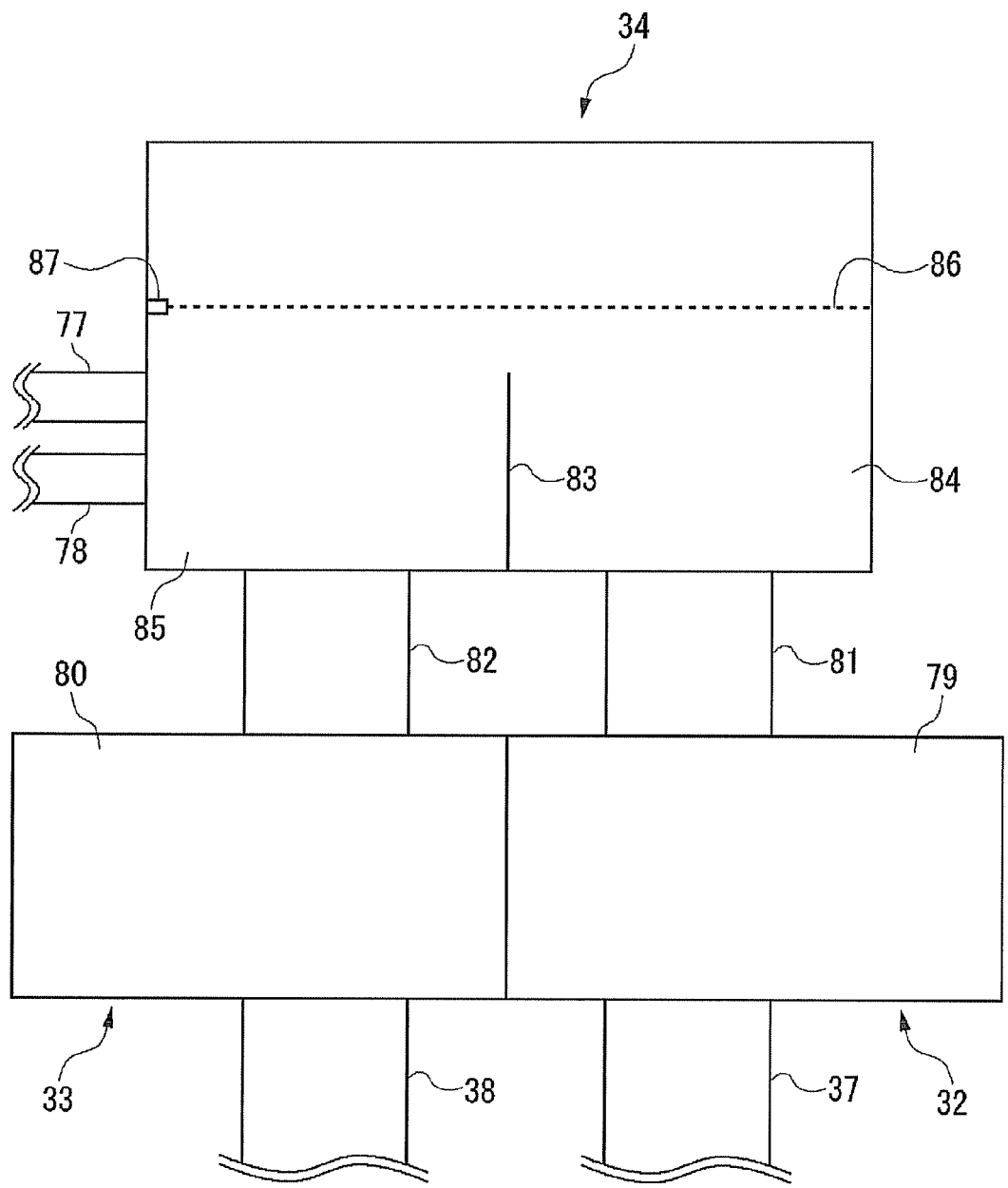
FIG. 6 is a diagram illustrating the internal configuration of a reservoir and a connection configuration with a pipeline.

FIG. 6 is a diagram illustrating the internal configuration of the reservoir 34 and a connection configuration with a pipeline. To the reservoir 34, the reservoir pipeline 77 for returning the flow of the brake fluid from the wheel cylinders 23, the pump pipeline 78 for supplying the brake fluid to the hydraulic power source 30, a first pipeline 81 and a second pipeline 82 for supplying the brake fluid to the master cylinder 32 and the regulator 33, respectively, are connected. The inside of a tank of the reservoir 34 is divided into a first reservoir chamber 84 for storing the brake fluid for the master cylinder 32 and a second reservoir chamber 85 for storing the brake fluid for the regulator 33 by a partition wall 83.

A line 86 for reduction determination shown by a dashed line indicates a standard for checking for a reduction in the amount of the brake fluid in the tank. The reservoir 34 is provided with a switch for detecting a storage volume reduction for outputting an OFF signal when the fluid surface of the brake fluid is above the line 86 for reduction determination and for outputting an ON signal when the fluid surface of the brake fluid is below the line 86 for reduction determination. A means for detecting the amount of the brake fluid may be provided to the reservoir 34 so that the brake ECU 70 is notified of a detected value, and the brake ECU 70 may determine whether or not the amount of the brake fluid has fallen below the standard value specified by the line 86 for reduction determination.

When the amount of the brake fluid in the tank decreases such that the fluid surface goes further below the line 86 for reduction determination, the fluid surface reaches the upper end of the partition wall 83. For example, even if the brake fluid in the second reservoir chamber 85 leaks to the outside when there is fluid leakage in the individual flow channel 43 of the second hydraulic pressure circuit, the fluid surface of the brake fluid in the first reservoir chamber 84 does not go below the upper end of the partition wall 83 since the first reservoir chamber 84 is separated from the second reservoir chamber 85 by the partition wall 83, and the first hydraulic pressure circuit can thus be maintained to be in an operable state. When all the brake fluid in the second hydraulic pressure circuit leaks, a pressure value that is detected by the regulator pressure sensor 71 and the accumulator pressure sensor 72 drops to zero.

When the brake pedal 24 is depressed in this state with a high pedal effort of, for example, at least 900 N, only the brake fluid in the first hydraulic pressure circuit is pressurized. Thus, the differential pressure (Pfr−Prr) at the isolation valve 60 becomes large, and the isolation valve 60 is sometimes opened when the differential pressure exceeds the automatic opening pressure P1. When the hydraulic pressure in the second flow channel 45b is substantially zero, the hydraulic pressure Pfr of the first flow channel 45a becomes substantially equal to the differential pressure at the isolation valve 60 at this time.

When the fluid pressure in the first flow channel 45a exceeds the automatic opening pressure (9 MPa), the isolation valve 60 opens, and the brake fluid in the first hydraulic pressure circuit thus flows to the second hydraulic pressure circuit side via the isolation valve 60. The amount of the brake fluid of the first hydraulic pressure circuit is reduced by the amount that has flowed into the second hydraulic pressure circuit at this time. The inventors of the present invention have confirmed through experiments that the fluid surface of the brake fluid in the first hydraulic pressure circuit goes down close to the border between the first pipeline 81 and the master chamber 79 when this action is repeated for about a few dozen times. If the brake pedal 24 is released while the brake fluid is located near the border between the first pipeline 81 and the master chamber 79, air gets in the master chamber 79, making it difficult for the hydraulic pressure to be raised.

For example, the following measures are possible options for overcoming the above trouble. Raising the automatic opening pressure by increasing the spring force by increasing the spring constant of the isolation valve 60 is a possible option as a first measure. In the above-stated example, the automatic opening pressure P1 is set to be 9 Mpa. However, by further raising the automatic opening pressure, the isolation valve 60 can be formed that cannot be opened easily by the differential pressure across the isolation valve 60 in the hydro-booster mode. However, during the normal time, i.e., during the regenerative coordination control mode, the isolation valve 60 is opened by supplying electric current thereto; thus, there is a problem where a large amount of electric current is required.

Raising the automatic opening pressure by increasing the flow channel resistance by reducing the size of the orifice of the isolation valve 60 is a possible option as a second measure. This overcomes the problem where the amount of the electric current is increased in the regenerative coordination control mode in the first measure. However, it takes longer for the brake fluid, which has flowed through the pressure-increasing linear control valve 66, to reach the first flow channel 45a, and the pressurization of the wheel cylinders 23 for rear wheels thus takes place earlier, resulting in a problem of unstable behavior of the vehicle.

The brake control apparatus 20 of the present embodiment performs a leakage prevention process for preventing the brake fluid in the first hydraulic pressure circuit from flowing into the second hydraulic pressure circuit in the hydro-booster mode where the isolation valve 60 is in the closed state.

Figure 7:
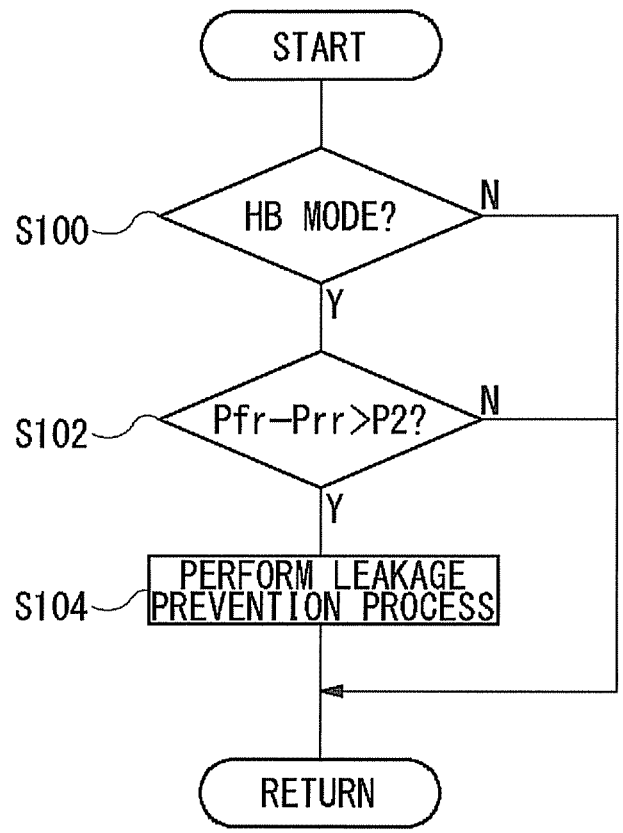
FIG. 7 is a flowchart illustrating basic control of a leakage prevention process of the present embodiment.

FIG. 7 is a flowchart illustrating basic control of the leakage prevention process of the present embodiment. The brake ECU 70 determines whether the brake control mode is the HB mode (S100). When the mode is not the HB mode (N in S100), the leakage prevention process is not performed. When the mode is the HE mode (Y in S100), the brake ECU 70 determines whether the differential pressure between the brake fluid pressure Pfr of the first hydraulic pressure circuit and the brake fluid pressure Prr of the second hydraulic pressure circuit exceeds a predetermined value P2 (S102). The predetermined value P2 is set to be smaller than the value of the automatic opening pressure P1 of the isolation valve 60. In the hydro-booster mode, the pressure Pfr is detected by the control pressure sensor 73, and the pressure Prr is detected by the regulator pressure sensor 71. The differential pressure (Pfr−Prr) is a value of the pressure applied across the isolation valve 60.

When the differential pressure (Pfr−Prr) is P2 or less (N in S102) due to the predetermined value P2 that is set to be smaller than the automatic opening pressure P1 of the isolation valve 60, the differential pressure applied to the isolation valve 60 is smaller than the automatic opening pressure; therefore, the isolation valve 60 is not opened. Therefore, the brake fluid in the first hydraulic pressure circuit will never flow into the second hydraulic pressure circuit via the isolation valve 60 in this state.

On the other hand, when the differential pressure (Pfr−Prr) is larger than P2 (Y in S102), the differential pressure may eventually reach P1, and the isolation valve 60 may be opened. Thus, the leakage prevention process for preventing the brake fluid in the first hydraulic pressure circuit from flowing into the second hydraulic pressure circuit is performed before the differential pressure between Pfr and Prr exceeds the automatic opening pressure P1 (S104). More specifically, by closing a predetermined control valve so as to prevent the brake fluid pressure in the first hydraulic pressure circuit from increasing, the brake ECU 70 ensures that the differential pressure between Pfr and Prr does not exceed the automatic opening pressure P1. In the present embodiment, the brake ECU 70 closes the master cut valve 64 provided in the middle between the reservoir 34 and the isolation valve 60 so as to block the hydraulic pressure supplied by the master cylinder 32, thus preventing the hydraulic pressure in the downstream of the master cut valve 64 from being increased. This allows the brake control apparatus 20 to provide the brake fluid pressure Pfr, which is obtained at the time the master cut valve 64 is closed, to the wheel cylinders 23 for front wheels while maintaining the amount of the fluid in the first hydraulic pressure circuit.

Figure 8:
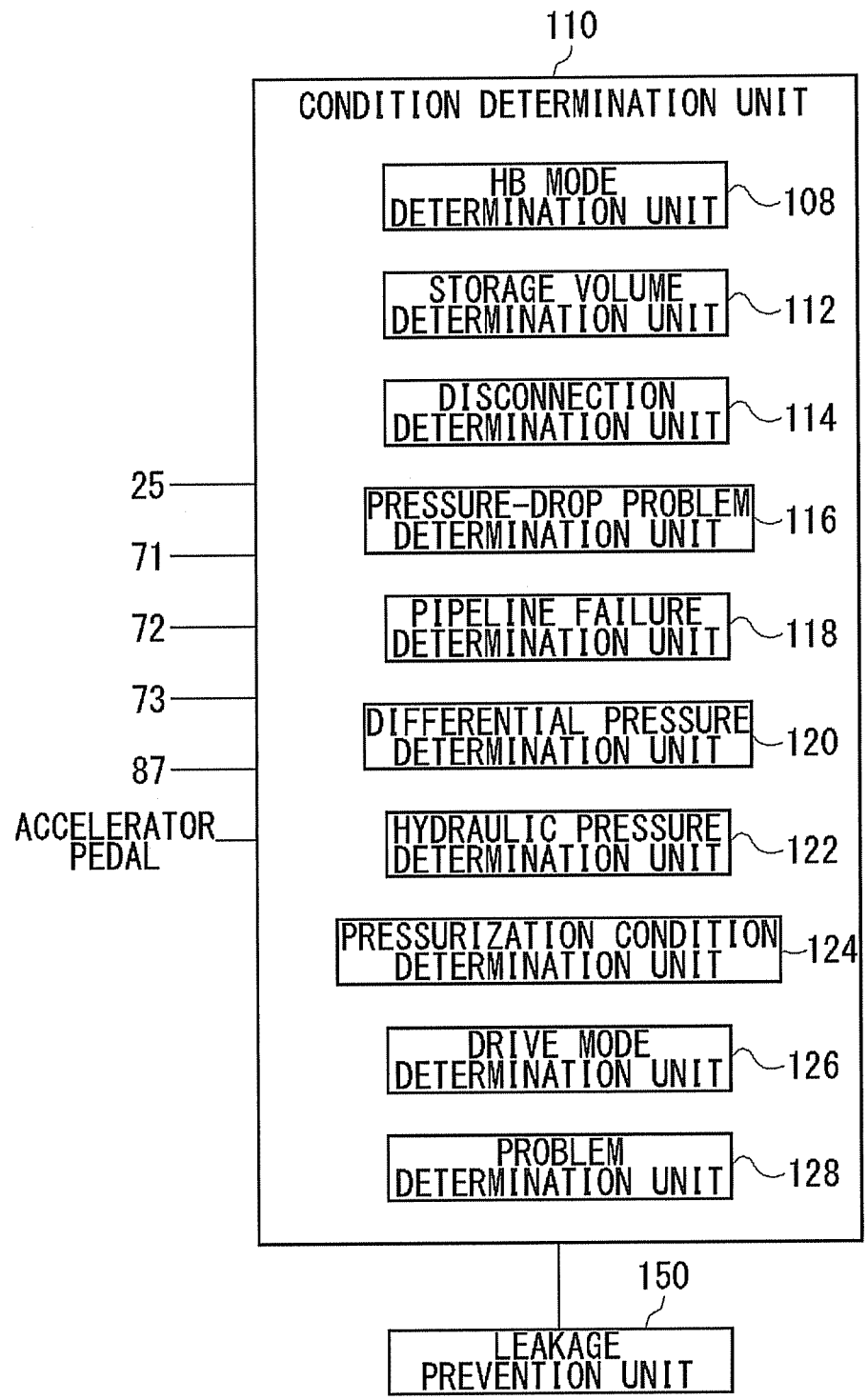
FIG. 8 is a diagram illustrating the configuration of a brake ECU that performs the leakage prevention process.

The basic control of the leakage prevention process is explained above. More details thereof are given in the following. FIG. 8 illustrates the configuration of the brake ECU 70 that performs the leakage prevention process. The brake ECU 70 is provided with a condition determination unit 110 and a leakage prevention unit 150. The leakage prevention unit 150 controls the implementation and discontinuation of the leakage prevention process and controls the opening and closing of the master cut valve 64 in the present embodiment. The condition determination unit 110 performs a condition determination process for determining a control policy in the leakage prevention unit 150. The condition determination unit 110 has an HB mode determination unit 108, a storage volume determination unit 112, a disconnection determination unit 114, a pressure-drop problem determination unit 116, a pipeline failure determination unit 118, a differential pressure determination unit 120, a hydraulic pressure determination unit 122, a pressurization condition determination unit 124, a drive mode determination unit 126, and a problem determination unit 128.

In FIG. 8, the elements shown in functional blocks that indicate a variety of processes are implemented in hardware by any CPU (Central Processing Unit), memory, or other LSI's, and in software by a program loaded in memory, etc. Therefore, it will be obvious to those skilled in the art that the functional blocks may be implemented in a variety of manners by a combination of hardware and software.

Figure 9:
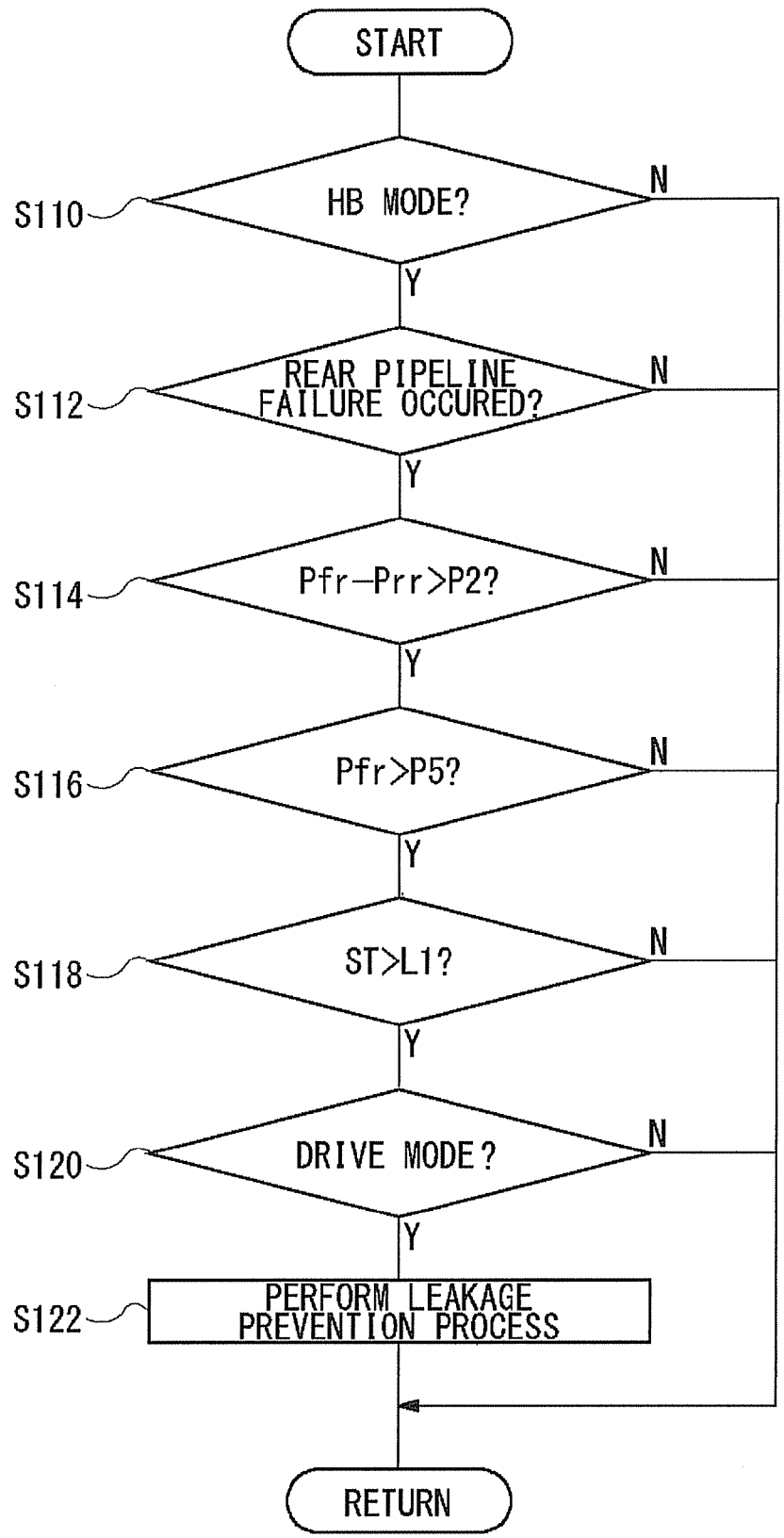
FIG. 9 is a flowchart illustrating the details of the control of a leakage prevention process of the present embodiment.

FIG. 9 is a flowchart illustrating the details of the control of a leakage prevention process of the present embodiment. The HB mode determination unit 108 determines whether the brake control mode is the HB mode (S110). When the mode is not the HB mode (N in S110), the leakage prevention process is not performed. When the mode is the HB mode (Y in S110), the condition determination unit 110 determines whether the rear pipeline failure has been generated (S112). A pipeline failure determination process S112 is performed by the storage volume determination unit 112, the disconnection determination unit 114, the pressure-drop problem determination unit 116, and the pipeline failure determination unit 118.

Figure 10:
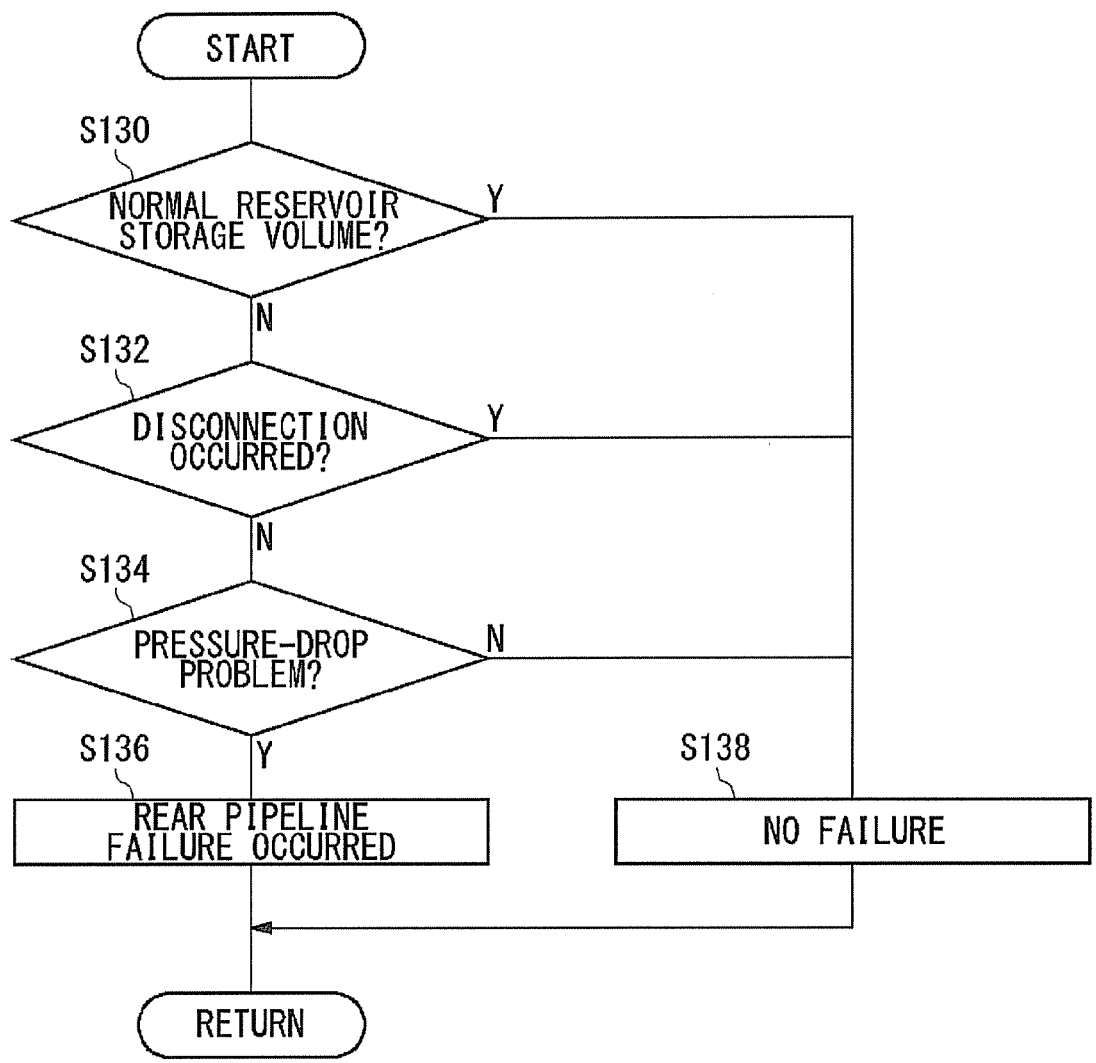
FIG. 10 is a diagram illustrating a flowchart that illustrates a pipeline failure determination process S112.

FIG. 10 illustrates a flowchart for illustrating the pipeline failure determination process S112. The storage volume determination unit 112 determines whether the storage volume of the reservoir 34 is normal upon reception of a signal from the switch 87 for detecting storage volume reduction (S130). An OFF signal fed by the switch 87 for detecting storage volume reduction indicates that the fluid surface of the brake fluid is above the line 86 for reduction determination, and an ON signal indicates that the fluid surface of the brake fluid is below the line 86 for reduction determination. Therefore, the storage volume determination unit 112 determines that the storage volume is normal upon reception of the OFF signal (Y in S130), and the pipeline failure determination unit 118 determines that no pipeline failure has been generated (S138).

On the other hand, the storage volume determination unit 112 determines that the storage volume of the reservoir 34 is not normal upon reception of the ON signal (N in S130). With this, it is determined that the amount of the brake fluid in the reservoir 34 has fallen below the standard value specified by the line 86 for reduction determination. The disconnection determination unit 114 determines whether there is any failure that has been generated in the switch 87 for detecting storage volume reduction and, more specifically, whether there is disconnection (S132) at this time. When there is disconnection (Y in S132), the pipeline failure determination unit 118 determines that no pipeline failure has been generated since the ON signal from the switch 87 for detecting storage volume reduction is not reliable (S138).

When there is no disconnection (N in S132), the pressure-drop problem determination unit 116 determines whether or not there is a pressure-drop problem by using the brake fluid pressure Prr in the second hydraulic pressure circuit and/or brake fluid pressure Pacc in the accumulator flow channel on the upstream side of the pressure-increasing linear control valve 66 (S134). The brake fluid pressure Prr in the second hydraulic pressure circuit is detected by the regulator pressure sensor 71, and the brake fluid pressure Pacc in the accumulator flow channel is detected by the accumulator pressure sensor 72. The pressure-drop problem determination unit 116 may perform the pressure-drop problem determination process by using the two respective brake fluid pressures of the second hydraulic pressure circuit and the accumulator flow channel, or by using either one of the brake fluid pressures. When it is not determined that there is a pressure-drop problem (N in S134), the pipeline failure determination unit 118 determines that no pipeline failure has been generated (S138). When it is determined that there is a pressure-drop problem that has been generated (N in S136), the pipeline failure determination unit 118 determines that the pipeline failure has been generated (S136) and detects leakage of the brake fluid to the outside of the second hydraulic pressure circuit. As described above, the pipeline failure determination unit 118 also functions as a leakage detection means for detecting leakage of the brake fluid to the outside of a hydraulic pressure circuit. A detailed description will be given of the pressure-drop problem determination process S134 performed by the pressure-drop problem determination unit 116 in the following.

Figure 11:
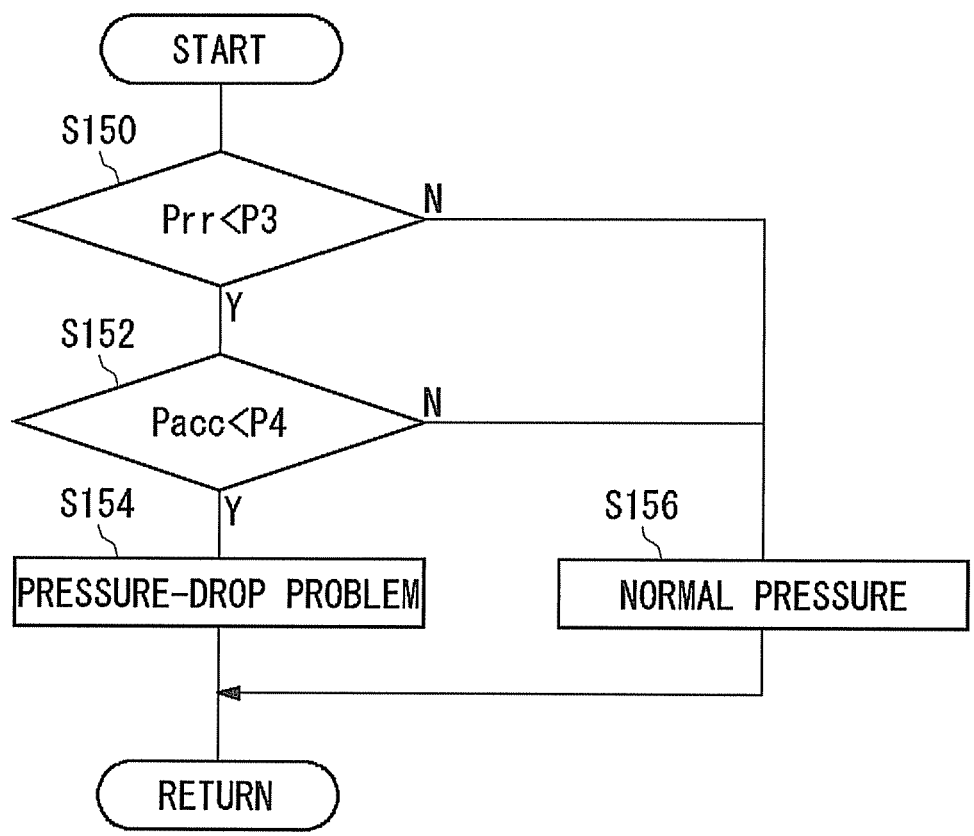
FIG. 11 is a diagram illustrating a flowchart that illustrates a pressure-drop problem determination process S134.

FIG. 11 illustrates a flowchart for illustrating the pressure-drop problem determination process S134. The pressure-drop problem determination unit 116 compares the brake fluid pressure Prr in the second hydraulic pressure circuit with a predetermined value P3 (S150). The predetermined value P3 is set to be a value in a range of, for example, 0.5-1 MPa. When the brake fluid pressure Prr in the second hydraulic pressure circuit is at least P3 (N in S150), the pressure-drop problem determination unit 116 determines that no pressure-drop problem has been generated (S156).

When the brake fluid pressure Prr in the second hydraulic pressure circuit is smaller than P3 (Y in S150), the pressure-drop problem determination unit 116 compares the brake fluid pressure Pacc in the accumulator flow channel with a predetermined value P4 (S152). The predetermined value P4 is set to be, for example, about 2 MPa. When the brake fluid pressure Pacc in the accumulator flow channel is at least P4 (N in S152), the pressure-drop problem determination unit 116 determines that no pressure-drop problem has been generated (S156). On the other hand, when the brake fluid pressure Pacc in the accumulator flow channel is smaller than P4 (Y in S152), the pressure-drop problem determination unit 116 determines that a pressure-drop problem has been generated (S154).

As explained for the flowchart in FIG. 10, a result of determining a pressure-drop problem in S134 is used as a determination condition for generation of failure in the rear pipeline. When the storage volume in the reservoir 34 falls below the standard value while it is determined that there is a pressure-drop problem, the pipeline failure determination unit 118 determines that a pipeline failure has occurred. This allows for detection of leakage of the brake fluid to the outside with high accuracy.

Since the brake fluid pressure varies over time, a time condition may be further added to determine the presence of a pressure-drop problem for a purpose of preventing erroneous determination.

Figure 12:
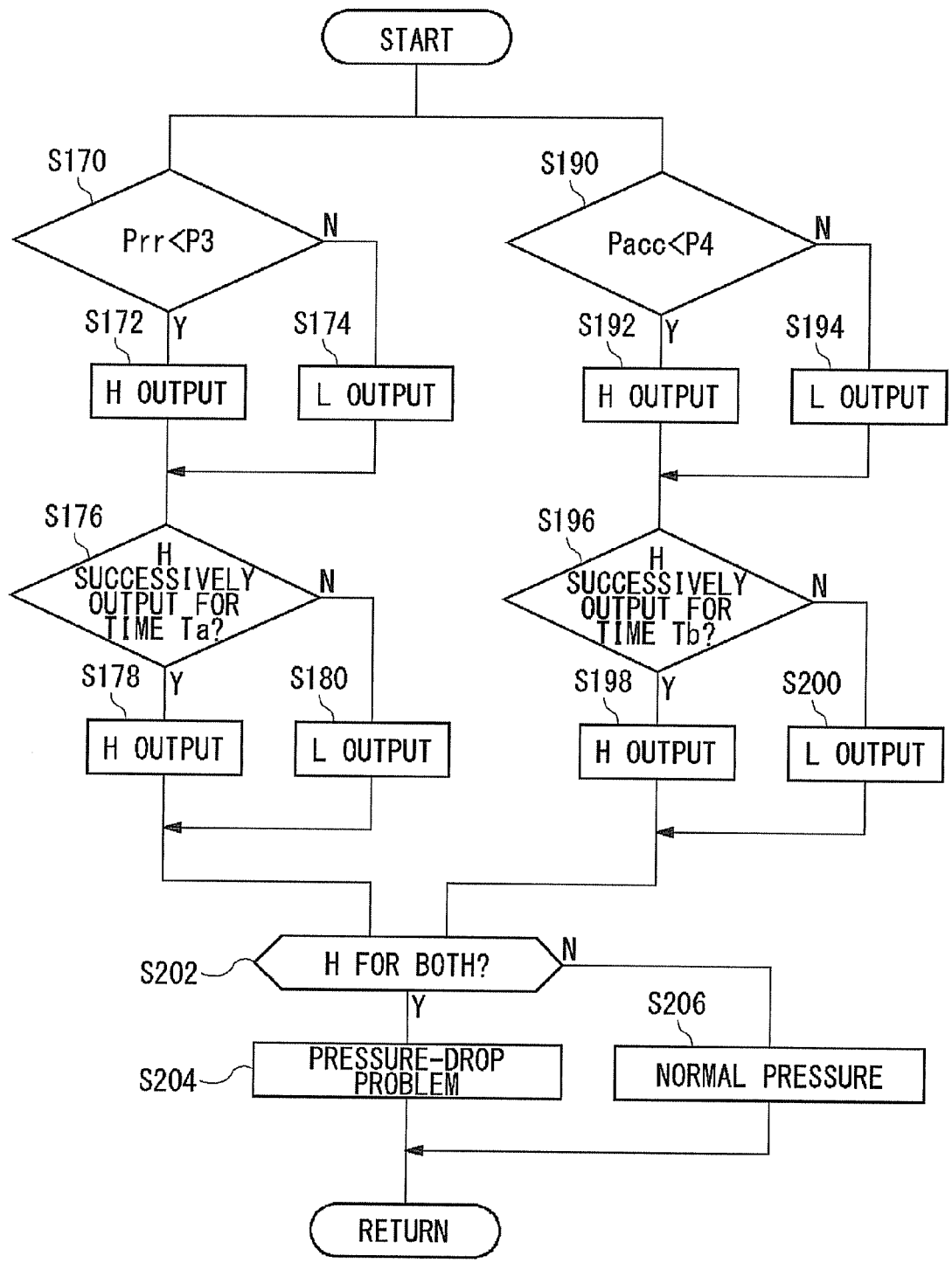
FIG. 12 is a diagram illustrating a flowchart that is obtained by adding time conditions to the pressure-drop problem determination process S134 shown in FIG. 11.

FIG. 12 illustrates a flowchart that is obtained by adding time conditions to the pressure-drop problem determination process S134 shown in FIG. 11. The pressure-drop problem determination unit 116 acquires the brake fluid pressures Prr and Pacc respectively from the regulator pressure sensor 71 and the accumulator pressure sensor 72 at a predetermined cycle. The pressure-drop problem determination process shown in FIG. 12 is performed every time the pressure-drop problem determination unit 116 acquires detection values of the respective sensors, and the detection values of the respective sensors are processed in parallel.

An explanation is first given of a determination process of the brake fluid pressure Prr in the second hydraulic pressure circuit. The pressure-drop problem determination unit 116 compares the brake fluid pressure Prr with the predetermined value P3 (S170). When the brake fluid pressure Prr is smaller than P3 (Y in S170), the pressure-drop problem determination unit 116 outputs an H value to buffer memory (not shown) as a comparison result (S172). When the brake fluid pressure Prr is at least P3 or when the comparison cannot be carried out (N in S170), the pressure-drop problem determination unit 116 outputs an L value to the buffer memory as a comparison result (S174). This comparison is carried out at a predetermined cycle, and comparison results obtained for a predetermined period of time (greater than the time Ta) are stored in the buffer memory.

In reference to comparison results stored in the buffer memory, from the latest one through an earlier one stored at the present time minus the time Ta, the pressure-drop problem determination unit 116 determines whether the H value has been successively output for the time Ta at that point in time (S176). When all the comparison results indicate the H value, the pressure-drop problem determination unit 116 determines that a state where the brake fluid pressure Prr is smaller than the predetermined value P3 has continued for the time Ta (Y in S176) and outputs the H value to memory for determination (not shown) as a determination value (S178). On the other hand, when even one L value is present in the comparison results, the pressure-drop problem determination unit 116 determines that the state where the brake fluid pressure Prr is smaller than the predetermined value P3 has not continued for the time Ta (N in S176) and outputs the L value to the memory for determination as a determination value (S180). The determination process in S176 is performed every time the comparison process in S170 is carried out, and the value stored in the memory for determination is updated accordingly.

Similarly, the pressure-drop problem determination unit 116 compares the accumulator pressure Pacc with the predetermined value P4 (S190). When the accumulator pressure Pacc is smaller than P4 (Y in S190), the pressure-drop problem determination unit 116 outputs the H value to the buffer memory as a comparison result (S192). When the accumulator pressure Pacc is at least P4 or when the comparison cannot be carried out (N in S190), the pressure-drop problem determination unit 116 outputs the L value to the buffer memory as a comparison result (S194). This comparison is carried out at a predetermined cycle, and comparison results obtained for a predetermined period of time (greater than the time Tb) is stored in the buffer memory.

In reference to comparison results stored in the buffer memory, from the latest one through an earlier one stored at the present time minus the time Tb, the pressure-drop problem determination unit 116 determines whether the H value has been successively output for the time Tb at that point in time (S196). When all the comparison results indicate the H value, the pressure-drop problem determination unit 116 determines that a state where the accumulator pressure Pacc is smaller than the predetermined value P4 has continued for the time Tb (Y in S196) and outputs the H value to the memory for determination as a determination value (S198). On the other hand, when even one L value is present in the comparison results, the pressure-drop problem determination unit 116 determines that the state where the accumulator pressure Pacc is smaller than the predetermined value P4 has not continued for the time Tb (N in S196) and outputs the L value to the memory for determination as a determination value (S200). The determination process in S196 is performed every time the comparison process in S190 is carried out, and the value stored in the memory for determination is updated accordingly.

In reference to the two determination values output to the memory for determination, the pressure-drop problem determination unit 116 determines whether both of the values are the H values (S202). When both of the values are the H values (Y in S202), both Prr and Pacc show abnormal values, and the pressure-drop problem determination unit 116 determines that a pressure-drop problem has been generated (S204). As described above, a pressure-drop problem can be determined with high accuracy by determining the pressure-drop state by using a duration-time condition. When even one of the two determination values shows the L value (N in S202), the pressure-drop problem determination unit 116 determines that no pressure-drop problem has been generated (S206).

The brake ECU 70 has a function of performing a system check at the time of startup. During the system check, the operation of an electromagnetic valve, etc., is tested so as to check whether normal brake control can be carried out. The system check is triggered, for example, by opening of a door of the vehicle or by depression of the brake pedal 24 while the ignition is off.

FIG. 13 illustrates transition of processes and state values when there is a pipeline failure at the time the ECU is started. A horizontal axis represents a time axis. FIG. 13A shows the state value for braking determination, where OFF indicates a state in which the brake pedal 24 is not being depressed and where ON indicates a state in which the brake pedal 24 is being depressed. FIG. 13B shows a startup condition value of the brake ECU 70, where OFF indicates a state in which the brake ECU 70 is not being started and where ON indicates a state in which the brake ECU 70 has been started. An example shown in FIG. 13B shows that the startup of the brake ECU 70 is triggered by the depression of the brake pedal 24.

FIG. 13C shows transition of the brake control mode. This example is based on the assumption of a condition where the hydro-booster mode is carried out directly after the system check. The system check is carried out immediately after the startup of the brake ECU 70, and the hydro-booster mode is carried out after time Ts.

FIG. 13D shows a comparison value between the accumulator pressure Pacc and the predetermined value P4. The L value shows a state where an expression (Pacc<P4) is not true or a state where the comparison cannot be carried out, and the H value shows a state where the expression (Pacc<P4) is determined to be true. In this example, the comparison between Pacc and P4 cannot be carried out during the system check, and the L value is thus output. On the other hand, it is determined that the expression (Pacc<P4) is true, and the H value is output after the system check. This is as explained in, for example, S190 in FIG. 12.

As explained for S196 in FIG. 12, the pressure-drop problem determination unit 116 determines that a pressure-drop problem has been generated in the accumulator pressure Pacc when the H value, which indicates that the expression (Pacc<P4) is true, is successively output. A description of FIG. 9 and other figures will be given later. The leakage prevention process is performed when both a condition for a pressure-drop problem shown in FIG. 12 and the other conditions for performing the leakage prevention process are satisfied. FIG. 13E shows a state where the leakage prevention process is performed on the premise that the other conditions are satisfied when the H value, which indicates that the expression (Pacc<P4) is true, is successively output for time Tb after the system check.

During the startup of the brake ECU 70, the determination of the execution conditions for performing the leakage prevention process is conducted after the system check. If it takes a period of time Ts for the system check to be completed, the leakage prevention process is started after time (Ts+Tb) from the startup of the brake ECU 70 at the earliest. As described above, in the case when the brake ECU 70 is started by depressing the brake pedal 24, the determination of the pressure-drop problem is preferably completed earlier than normal since the brake pedal 24 has already been depressed.

Immediately after the system check, the pressure-drop problem determination unit 116 determines a pressure-drop problem in the accumulator pressure Pacc when the state where the accumulator pressure Pacc is smaller than the predetermined value P4 has continued for the time Tc, which is shorter than the time Tb. FIG. 13F shows a state where the leakage prevention process is performed after the time Tc on the premise that the other execution conditions are satisfied, after the system check. As described above, the time for the time condition in the pressure-drop problem determination is preferably set to be short, particularly after the system check, so that the leakage prevention process can be preformed earlier than usual. In reference to FIG. 12, it is determined, before S196, whether the system check had been performed the time Tc earlier, in this early-stage determination process. When the system check had been performed the time Tc earlier, the H value is output to the memory for determination if the H value has been successively output for the time Tc, and the L value is output to the memory for determination if the H value has not been successively output. When the system check had not been performed the time Tc earlier, the already-explained step S196 is performed.

FIG. 13 shows an example where the time for the time condition Tb is shortened. However, in reference to S176 and S196 in FIG. 12, the time for the time condition Ta of the second hydraulic pressure circuit may be shortened, or either the time for the time condition Ta or the time for the time condition Tb, whichever is longer, may be shortened.

FIG. 9 is referred back. As explained regarding FIGS. 10-13 in the above, the leakage prevention process is not performed when the pipeline failure determination unit 118 does not determine that failure has occurred in the rear pipeline based on the pressure-drop problem determination result or the like (N in S112), and the brake ECU 70 performs a differential pressure determination process S114 when he pipeline failure determination unit 118 determines that failure has occurred (Y in S112).

The differential pressure determination process S114 corresponds to a process shown as S102 in FIG. 7. The differential pressure determination unit 120 determines whether the differential pressure between the brake fluid pressure Pfr of the first hydraulic pressure circuit and the brake fluid pressure Prr of the second hydraulic pressure circuit exceeds a predetermined value P2 (S114). Preferably, the predetermined value P2 is set to be slightly smaller than the automatic opening pressure P1 of the isolation valve 60 so that the leakage prevention process is not performed until just before the isolation valve 60 opens automatically by the differential pressure. When the differential pressure does not exceed the predetermined value P2 (N in S114), the leakage prevention process is not performed. When the differential pressure exceeds the predetermined value P2 (Y in S114), the brake ECU 70 performs a determination process S116 of the brake fluid pressure Pfr.

A hydraulic pressure determination unit 122 determines whether the brake fluid pressure Pfr of the first hydraulic pressure circuit exceeds a predetermined value P5 (S116). Comparing Pfr with P5, the hydraulic pressure determination unit 122 determines whether the pressure Pfr has reached pressure that is sufficient for performing the leakage prevention process. In the leakage prevention process of the present embodiment, the brake ECU 70 closes the master cut valve 64 so as to block the hydraulic pressure, which is supplied by the master cylinder 32, by means of the master cut valve 64, thus preventing the hydraulic pressure in the downstream of the master cut valve 64 from being increased, as described regarding S104 in FIG. 7. After the master cut valve 64 is closed, the brake fluid of the first hydraulic pressure circuit is not pressurized. Thus, When the leakage prevention process is being performed, in other words, when the master cut valve 64 is being closed, Pfr needs to have reached the pressure that is necessary for ensuring sufficient braking force. The predetermined value P5 is set to be the value of the pressure that ensures sufficient braking force, for example, a value that satisfies regulated performance. When Pfr is P5 or less (N in S116), the leakage prevention process is not performed. When Pfr is over P5 (Y in S116), the leakage prevention process can be preformed.

When the brake fluid pressure Pfr is larger than the predetermined value P5, the pressurization condition determination unit 124 determines a pressurization condition of the first hydraulic pressure circuit (S118). The pressurization condition determination unit 124 is capable of determining whether or not the first hydraulic pressure circuit is in a pressurizable condition and further determining the degree of the pressurization when the first hydraulic pressure circuit is in a pressurizable condition. For example, the pressurization condition determination unit 124 determines the pressurization condition of the first hydraulic pressure circuit based on the output from the stroke sensor 25. The stroke sensor 25 detects a pedal stroke as the operation amount of the brake pedal 24, and the pressurization condition determination unit 124 acquires a stroke amount ST that has been detected. The pressurization condition determination unit 124 may determine the pressurization condition of the first hydraulic pressure circuit based on the presence of accelerator operation.

In the present embodiment, a purpose is to open the isolation valve 60 so as to prevent the brake fluid from flowing into the second hydraulic pressure circuit from the first hydraulic pressure circuit when the brake pedal 24 is depressed with a high pedal effort. Upon the detection of the stroke amount ST being over a predetermined amount L1 (mm) (Y in S118), the pressurization condition determination unit determines that the brake pedal 24 has been depressed with a high pedal effort. Determining the pressurization condition as described above, it can be assumed that the brake pedal 24 is being depressed with a high pedal effort, and the leakage prevention process can thus be performed. When the stroke amount ST is L1 or below (N in S118), the pressurization condition determination unit 124 determines that the brake pedal 24 is not being depressed with a high pedal effort, and the leakage prevention process is not performed. The predetermined value L1 needs to be set to be a large value (e.g., 30 mm) in order to determine that the brake pedal 24 is being depressed with a high pedal effort. However, for a purpose of merely determining that the first hydraulic pressure circuit is in a pressurizable condition, the predetermined value L1 may be set to be a small value (e.g., 5 mm). When two stroke sensors 25 are provided, the stroke amount St may be derived from the average value of the two detection values.

When the first hydraulic pressure circuit is in a pressurizable condition, the drive mode determination unit 126 determines whether the vehicle is in a drive mode (S120). More specifically, the drive mode determination unit 126 determines whether the vehicle is in a test mode, a maintenance mode, or the like and determines that the vehicle is in the drive mode (Y in S120) when the vehicle is determined not to be in the test mode or the maintenance mode. On the other hand, when the vehicle is not in the drive mode (N in S120), the leakage prevention process is not performed.

Figure 14:
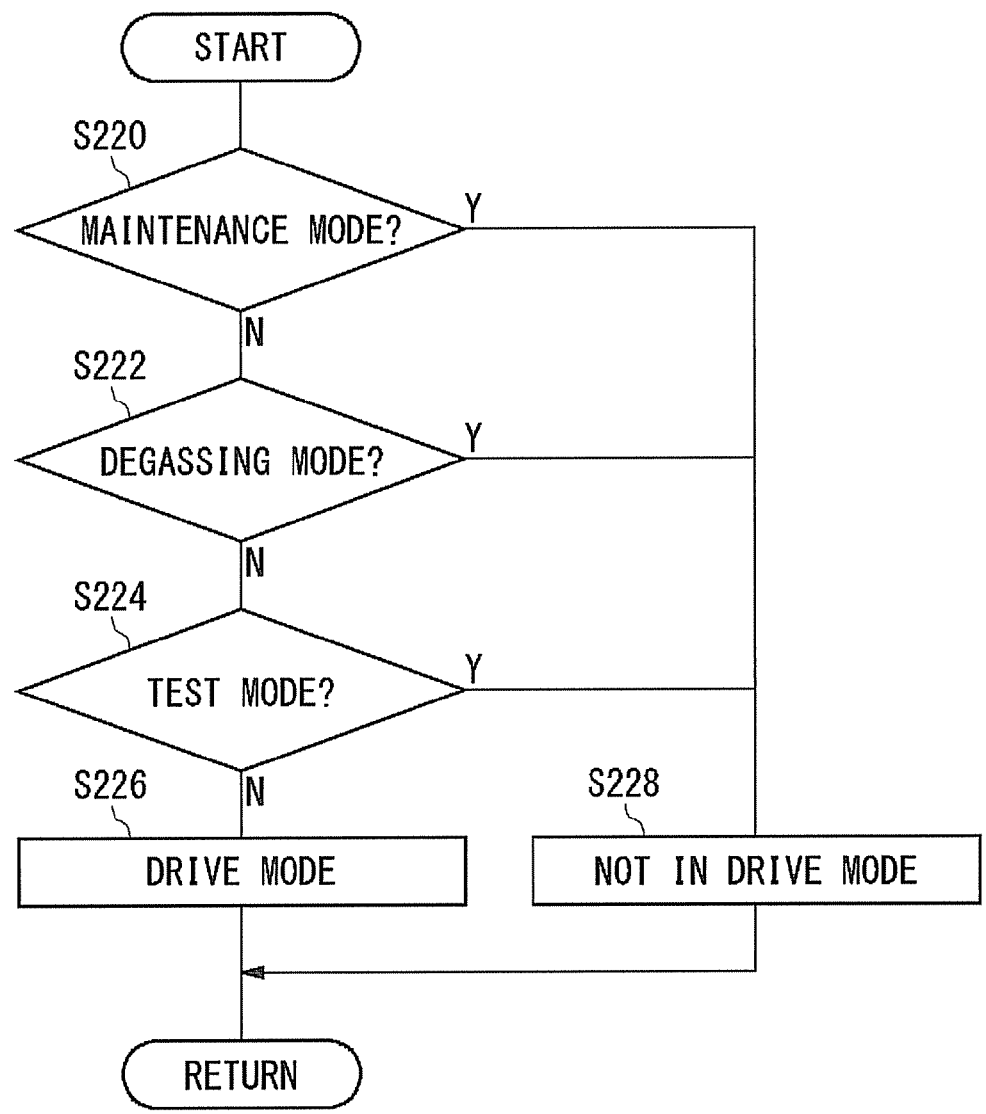
FIG. 14 is a flowchart illustrating a drive mode determination process S120.

FIG. 14 is a flowchart illustrating a drive mode determination process S120. In accordance with an environment the vehicle is in, the brake control apparatus 20 acquires mode information from outside and makes settings. After shipment, a drive mode flag that indicates that the vehicle is in a drivable state is set by default as the mode information. During testing in a factory, a test mode flag that indicates that the vehicle is being tested is provided from a testing apparatus. During vehicle maintenance at a dealer, a maintenance mode flag that indicates that maintenance is being performed on the vehicle is provided from a maintenance apparatus. When degassing is particularly carried out during the maintenance, a degassing mode flag may be provided.

The drive mode determination unit 126 determines whether the vehicle is on maintenance based on whether or not the maintenance mode flag has been set (S220). When the maintenance mode flag has been set (Y in S220), it is determined that the vehicle is not in the drive mode (S228). When the maintenance mode flag has not been set (N in S220), the drive mode determination unit 126 determines whether the vehicle is in the middle of degassing based on whether or not the degassing mode flag has been set (S222). When the degassing mode flag has not been set (Y in S222), it is determined that the vehicle is not in the drive mode (S228). When the degassing mode flag has not been set (N in S222), the drive mode determination unit 126 determines whether the vehicle is being tested based on whether or not the test mode flag has been set (S224). When the test mode flag has been set (Y in S224), it is determined that the vehicle is not in the drive mode (S228). When the test mode flag has not been set (N in S224), the drive mode determination unit 126 determines that the vehicle is in the drive mode (S226). The drive mode determination unit 126 may determine whether or not the vehicle is in the drive mode by referring only to the drive mode flag.

FIG. 9 is referred back. In S120, when the vehicle is determined not to be in the drive mode (N in S120), the leakage prevention process is not performed. On the other hand, when the vehicle is determined to be in the drive mode (Y in S120), all the execution conditions are satisfied. Thus, the leakage prevention unit 150 performs the leakage prevention process for preventing the brake fluid in the first hydraulic pressure circuit from flowing into the second hydraulic pressure circuit (S122).

The leakage prevention process S122 corresponds to a process shown as S104 in FIG. 7. The leakage prevention unit 150 closes the master cut valve 64 so as to block the hydraulic pressure, which is supplied by the master cylinder 32, by means of the master cut valve 64, thus preventing the hydraulic pressure in the downstream of the master cut valve 64 from being increased. This allows the brake control apparatus 20 to provide the brake fluid pressure Pfr, which is obtained at the time the master cut valve 64 is closed, to the wheel cylinders 23 for front wheels while maintaining the amount of the fluid in the first hydraulic pressure circuit. In addition to closing the master cut valve 64, the leakage prevention unit 150 may prevent the leakage of the brake fluid by decreasing the differential pressure at the isolation valve 60. For example, the differential pressure at the isolation valve 60 may be decreased by opening the ABS pressure-reducing valves 56 and 57 for a short period of time so that the brake fluid flows into the reservoir pipeline 77 while preventing the hydraulic pressure from being increased in the first hydraulic pressure circuit. In this case, the degree of opening the ABS pressure-reducing valves 56 and 57 is adjusted so that a sufficient brake fluid pressure can be provided to the wheel cylinders 23 for front wheels.

Described above is an explanation regarding the control where the conditions required for performing the leakage prevention process are determined so as to perform the leakage prevention process when the conditions are satisfied. In the following, an explanation is given of control where the leakage prevention process is stopped for the moment or canceled according to the situation when the leakage prevention process is being performed.

Figure 15A:
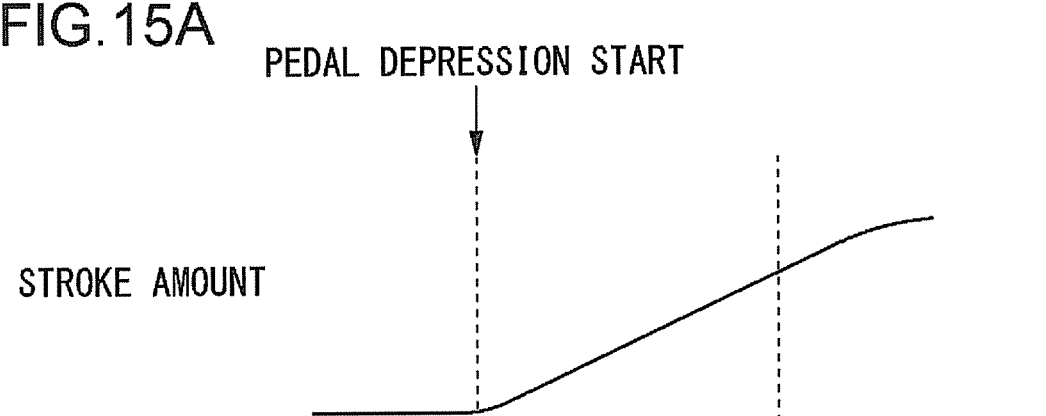
FIG. 15 is a diagram illustrating transition of state values and state quantity when the leakage prevention process is performed when other conditions are satisfied after brake hydraulic pressure Pfr in a first hydraulic pressure circuit exceeds P5 in S116 in FIG. 11.
Figure 15B:
Figure 15C:
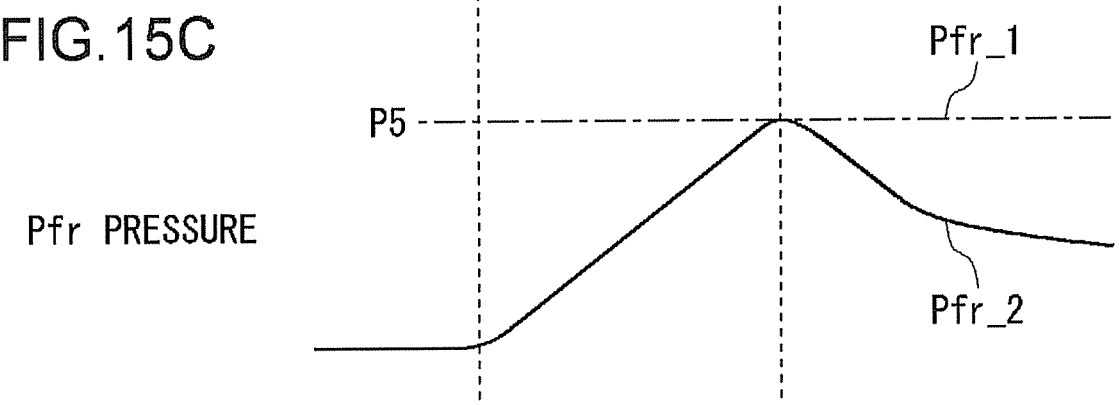

FIG. 15 illustrates transition of state values and state quantity when the leakage prevention process is performed when the other conditions are satisfied after the brake hydraulic pressure Pfr of the first hydraulic pressure circuit exceeds P5 in S116 in FIG. 11. FIG. 15A shows the stroke amount detected by the stroke sensor 25. FIG. 15C shows the transition of the pressure Pfr. As explained regarding FIG. 9, when Pfr exceeds P5, the leakage prevention process is performed upon the satisfaction of the other conditions. FIG. 153 shows a state where the leakage prevention process is performed on the premise that the other conditions are also satisfied, when Pfr exceeds P5.

When the leakage prevention process is performed, the master cut valve 64 is closed. Thus, the pressure Pfr is sealed in, and The pressure Pfr usually maintains the hydraulic pressure of P5 as shown in an alternate long and short dash line as Pfr_1. However, since the fluid viscosity is high at low temperature, the brake fluid becomes clogged for a short amount of time at the respective orifices of the ABS holding valves 51 and 52 of the first hydraulic pressure circuit. Thus, at low temperature, the brake fluid flows into the individual flow channels 41 and 42 later after the master cut valve 64 is closed. A situation can thus arise where the pressure Pfr cannot maintain P5, as shown in a solid line as Pfr_2. When the master cut valve 64 is maintained to be closed under such a situation, it is also possible that the brake fluid in the first hydraulic pressure circuit is not pressurized and that sufficient hydraulic pressure thus cannot be supplied.

Figure 16:
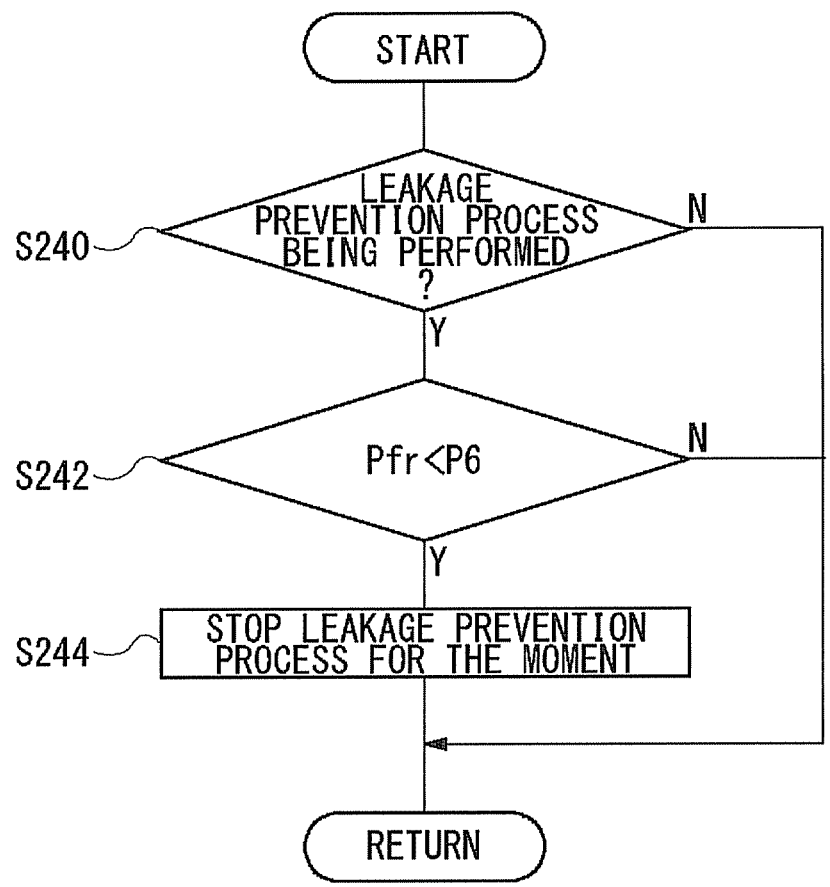
FIG. 16 is a flowchart illustrating a process of stopping the leakage prevention process for the moment.

FIG. 16 is a flowchart illustrating a process of stopping the leakage prevention process for the moment. When the leakage prevention process is not being performed (N in S240), the process of stopping the leakage prevention process for the moment is not performed. When the leakage prevention process is being performed (Y in S240), the hydraulic pressure determination unit 122 monitors a detection result by the control pressure sensor 73 (S242). When the brake fluid pressure Pfr is at least a predetermined value P6 (N in S242), the brake fluid pressure Pfr is maintained at a normal value, and the hydraulic pressure determination unit 122 continues the monitoring.

When the brake fluid pressure Pfr becomes smaller than the predetermined value P6 (Y in S242), the hydraulic pressure determination unit 122 sends a command for stopping the leakage prevention process to the leakage prevention unit 150. The predetermined value P6 is set to be the value of the pressure that is smaller than the predetermined value P5 and that ensures sufficient braking force, for example, a value that satisfies regulated performance. In order to prevent erroneous determination, the hydraulic pressure determination unit 122 may send the command for stopping the leakage prevention process upon the continuation of the state, where Pfr is smaller than P6, for a predetermined amount of time. The leakage prevention unit 150 stops the leakage prevention process for the moment upon reception of the stop command (S244). More specifically, the leakage prevention unit 150 stops current supply to the master cut valve 64 and opens the master cur valve 64. With this, the first hydraulic pressure circuit is pressurized upon receiving the hydraulic pressure from the master cylinders 32. When Pfr exceeds P5, the leakage prevention unit 150 performs the leakage prevention process again on the premise that the other conditions explained with reference to FIG. 9 are also satisfied.

Figure 17A:
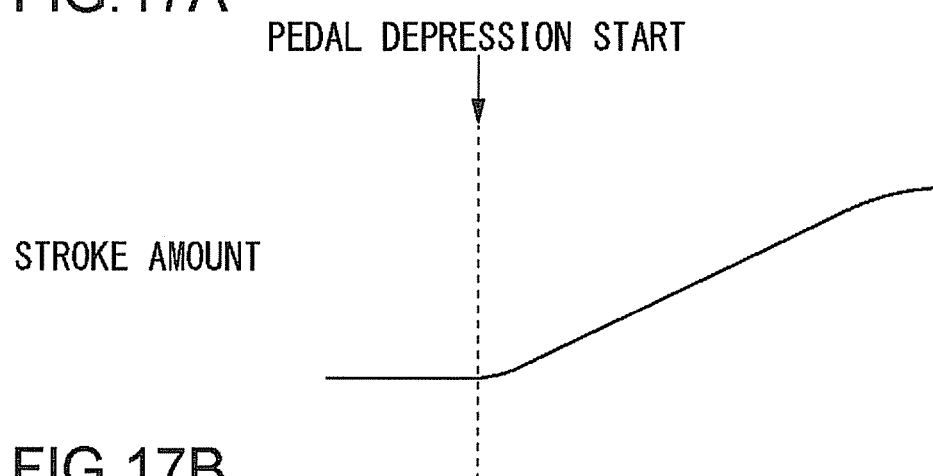
FIG. 17 is a diagram illustrating transition of state values and state quantity when the brake hydraulic pressure Pfr of the first hydraulic pressure circuit is kept between P6 and P5.
Figure 17B:
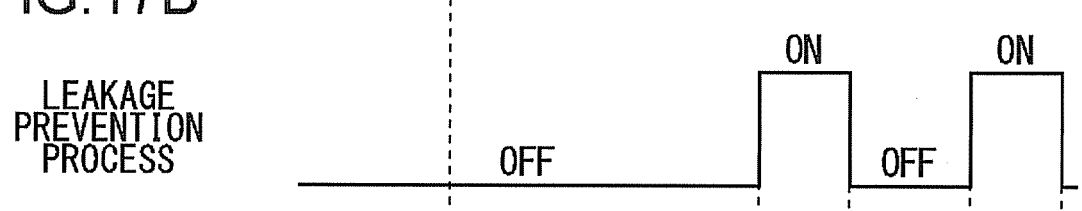
Figure 17C:
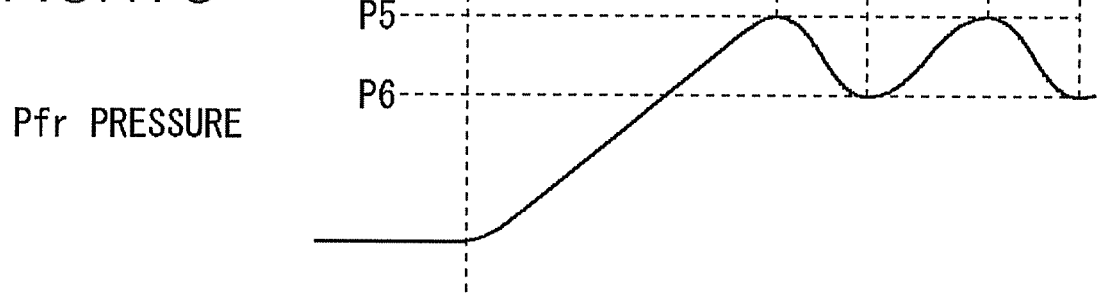

FIG. 17 illustrates transition of state values and state quantity when the brake hydraulic pressure Pfr of the first hydraulic pressure circuit is kept between P6 and P5. Just like FIG. 15, FIG. 17A shows the stroke amount detected by the stroke sensor 25. FIG. 17B shows the state transition of the execution and stopping of the leakage prevention process. FIG. 17C shows the transition of Pfr.

When Pfr exceeds P5, the leakage prevention unit 150 performs the leakage prevention process. ON the other hand, when Pfr becomes smaller than P6, the leakage prevention unit 150 stops the leakage prevention process for the moment. This control allows the brake fluid pressure Pfr in the first hydraulic pressure circuit to be kept between P6 and P5. Setting P6 to be the value of the pressure for ensuring sufficient braking force, the brake control apparatus 20 can generate sufficient braking force even when the leakage prevention process is being performed.

Figure 18:
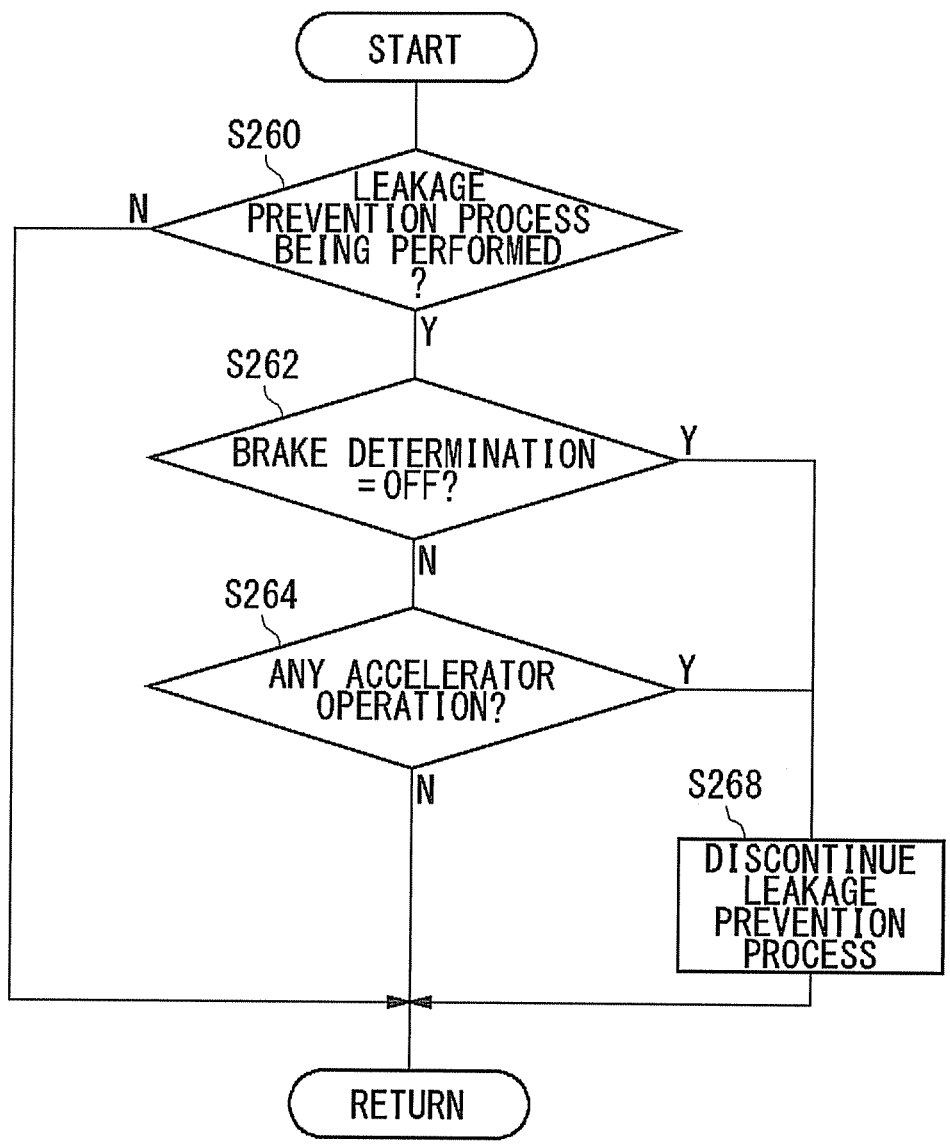
FIG. 18 is a flowchart illustrating an example of a process of discontinuing the leakage prevention process.

FIG. 18 is a flowchart illustrating an example of a process of discontinuing the leakage prevention process. When the leakage prevention process is not being performed (N in S260), the process of discontinuing the leakage prevention process is not performed. When the leakage prevention process is being performed (Y in S260), the pressurization condition determination unit 124 determines whether or not there is a braking request based on a pedal stroke amount detected by the stroke sensor 25 (S262). When the pedal stroke amount is not zero, the pressurization condition determination unit 124 determines that there is the braking request (N in S262) and then determines whether or not there is accelerator operation (S264). When the depression of an accelerator pedal is not detected, the pressurization condition determination unit 124 determines that there is no accelerator operation (N in S264).

When there is the braking request (N in S262) but no accelerator operation (N in S264), it can be considered that the first hydraulic pressure circuit is in a pressurizable state. Therefore, the leakage prevention process is continuously performed so that the brake fluid in the first hydraulic pressure circuit does not flow into the second hydraulic pressure circuit, in this case.

On the other hand, upon the detection of a state where there is no braking request (Y in S262) or where there is the accelerator operation (Y in S264), the pressurization condition determination unit 124 determines that the first hydraulic pressure circuit is not being pressurized. In other words, this indicates that the driver has an intention to start moving the vehicle. When the vehicle is started to move while the leakage prevention process is being performed, a dragging of the brake occurs due to the brake fluid pressure Pfr applied to the wheel cylinders 23. In such a case, the leakage prevention unit 150 discontinues the leakage prevention process that is being performed (S268). In other words, the brake pressure in the wheel cylinders 23 is released by opening the master cut valve 64, allowing the vehicle to be smoothly started to move.

Figure 19:
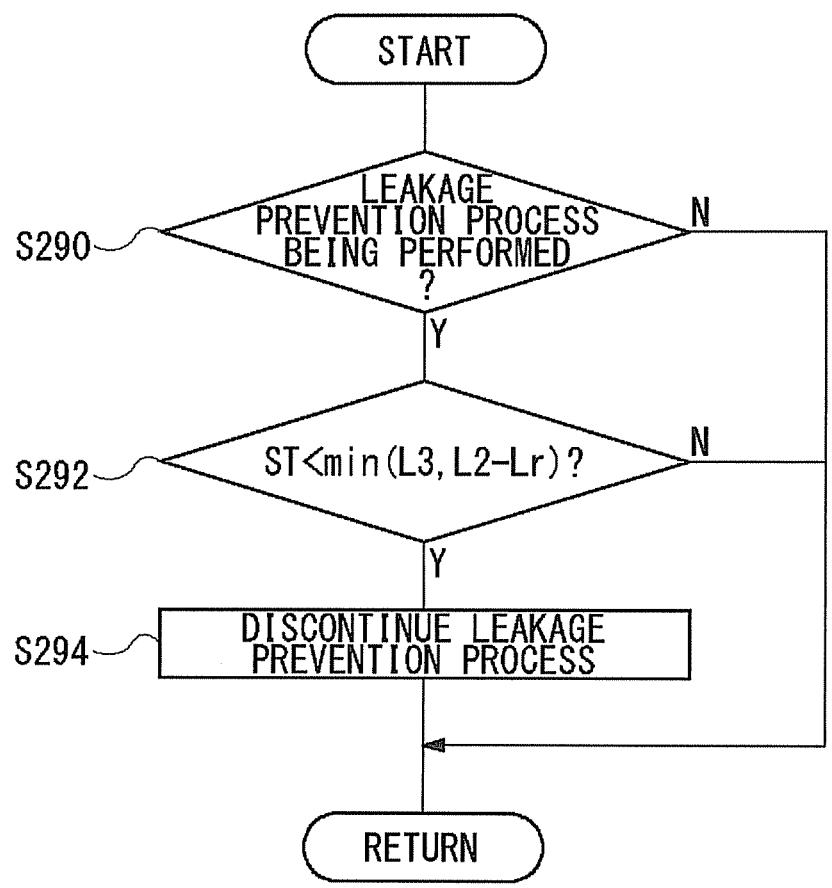
FIG. 19 is a flowchart illustrating another example of the process of discontinuing the leakage prevention process.

FIG. 19 is a flowchart illustrating another example of the process of discontinuing the leakage prevention process. When the leakage prevention process is not being performed (N in S290), the process of discontinuing the leakage prevention process is not performed. When the leakage prevention process is being performed (Y in S290), the pressurization condition determination unit 124 performs a process of determining the stroke amount of the brake pedal 24 (S292). More specifically, the pressurization condition determination unit 124 stores a pedal stroke amount L2, which is obtained at the time of performing the leakage prevention process, in the buffer memory in advance and determines whether or not the current pedal stroke amount is below a stroke amount of L2−Lr (Lr is a predetermined amount) or L3 (L3 is a predetermined amount), whichever the smaller. The value of L3 is smaller than the value of L1 explained in S118 in FIG. 9.

For example, L3 is set to be 28 mm, and Lr is set to be 15 mm. When the stroke amount L2 at the time of performing the leakage prevention process is 40 mm, the following expression is satisfied:

min (L3, L2−Lr)=25 mm In this case, when the current stroke amount ST becomes smaller than 25 mm (Y in S292), the leakage prevention unit 150 discontinues the leakage prevention process (S294). In the discontinuing process shown in FIG. 18, the leakage prevention process is discontinued when the braking request is off. However, according to the discontinuing process shown in FIG. 19, the leakage prevention process can be discontinued before the braking request becomes off, and feeling at the time of releasing the brake pedal 24 can thus be improved. When the current stroke amount ST is at least a value of min(L3, L2−Lr) (N in S292), the leakage prevention process is not discontinued. Setting a state, where the pedal stroke amount ST is smaller than L3 (L3 is smaller than L1) even at the maximum, to be a condition required for discontinuing the leakage prevention process provides an advantage of preventing a situation where the leakage prevention process is performed again immediately after the leakage prevention process is discontinued.

Figure 20:
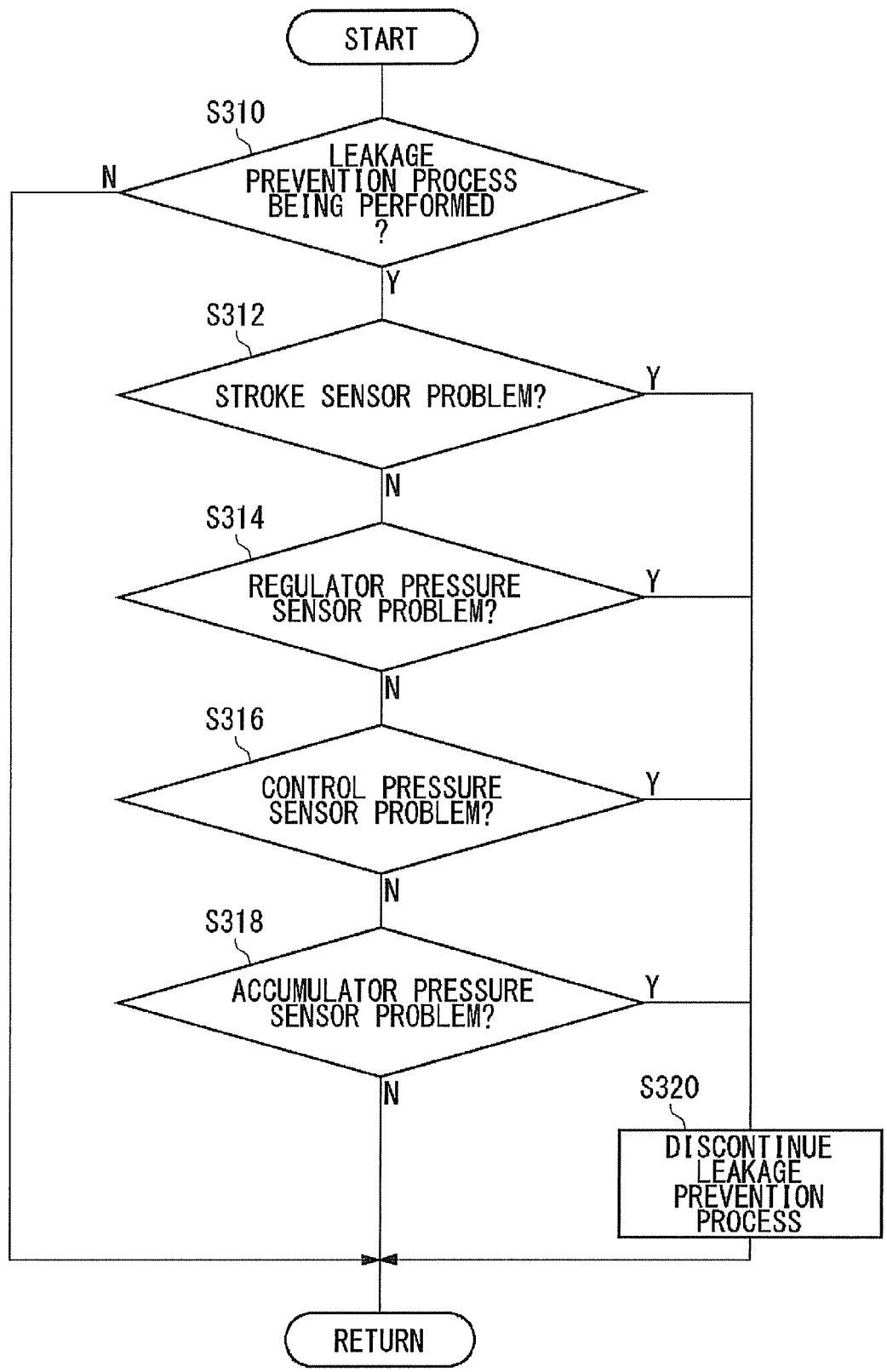
FIG. 20 is a flowchart illustrating yet another example of the process of discontinuing the leakage prevention process.

FIG. 20 is a flowchart illustrating yet another example of the process of discontinuing the leakage prevention process. When the leakage prevention process is not being performed (N in S310), the process of discontinuing the leakage prevention process is not performed. When the leakage prevention process is being performed (Y in S310), the problem determination unit 128 determines whether an output problem has occurred in the stroke sensor 25 (S312). When the output problem has not occurred in the stroke sensor 25 (N in S312), the problem determination unit 128 determines whether an output problem has occurred in the regulator pressure sensor 71 (S314). When the output problem has not occurred in the regulator pressure sensor 71 (N in S314), the problem determination unit 128 determines whether an output problem has occurred in the control pressure sensor 73 (S316). When the output problem has not occurred in the control pressure sensor 73 (N in S316), the problem determination unit 128 determines whether an output problem has occurred in the accumulator pressure sensor 72 (S318). When the output problem has not occurred in the accumulator pressure sensor 72 (N in S318), the leakage prevention unit 150 continuously performs the leakage prevention process.

On the other hand, when the output problem has occurred in the stroke sensor 25 (N in S312), the leakage prevention unit 150 discontinues the leakage prevention process (S320). When the output problem occurs due to failure of the stroke sensor 25, a braking request may be generated even without depression of the brake pedal 24. Since the master cut valve 64 is in a closed state when the leakage prevention process is being performed, generation of an erroneous braking request can cause a situation where the master cut valve 64 cannot be opened. Therefore, when the output problem occurs in the stroke sensor 25, it is preferred to discontinue the leakage prevention process and open the master cut valve 64.

When an output problem has occurred in the regulator pressure sensor 71 (Y in S314), when an output problem has occurred in the control pressure sensor 73 (Y in S316), or when an output problem has occurred in the accumulator pressure sensor 72 (Y in S318), the leakage prevention unit 150 discontinues the leakage prevention process (S320). Respective outputs from these hydraulic pressure sensors are also used for determining execution conditions of the leakage prevention process. Thus, when an output problem has occurred, it is preferred to discontinue the leakage prevention process and open the master cut valve 64 in order to prevent a situation where the master cut valve 64 is erroneously kept closed. A function of the problem determination unit 128 may be realized by the problem detection unit 100 shown in FIG. 5.

Figure 21:
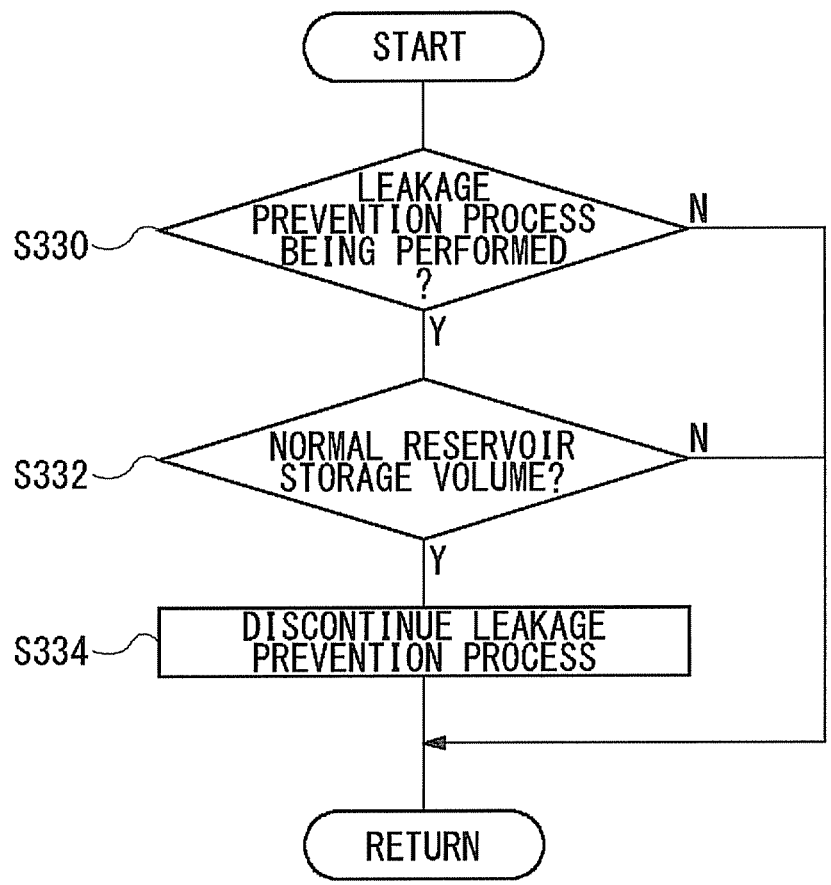
FIG. 21 is a flowchart illustrating yet another example of the process of discontinuing the leakage prevention process.

FIG. 21 is a flowchart illustrating yet another example of the process of discontinuing the leakage prevention process. When the leakage prevention process is not being performed (N in S330), the process of discontinuing the leakage prevention process is not performed. When the leakage prevention process is being performed (Y in S330), the storage volume determination unit 112 monitors a signal from the switch 87 for detecting storage volume reduction and determines whether the storage volume of the reservoir 34 is normal (S332). The storage volume determination unit 112 determines that the storage volume of the reservoir 34 is not normal upon reception of an ON signal (N in S332). With this, the leakage prevention unit 150 continues to perform the leakage prevention process. On the other hand, the storage volume determination unit 112 determines that the storage volume is normal upon reception of an OFF signal (Y in S332). For example, the storage volume of the reservoir 34 can be brought back to normal by refilling with brake fluid. When it is determined that the amount of the brake fluid in the reservoir 34 is brought to be at least the standard value specified by the line 86 for reduction determination from this, the leakage prevention unit 150 discontinues the leakage prevention process (S334).

Even when the storage volume of the reservoir 34 returns to normal, air can get into the accumulator 35, and the accumulator pressure Pacc thus may not be pressurized sufficiently. An example is now shown where a condition required for discontinuing the leakage prevention process is determined with high accuracy by using a detection value of the accumulator pressure sensor 72.

Figure 22:
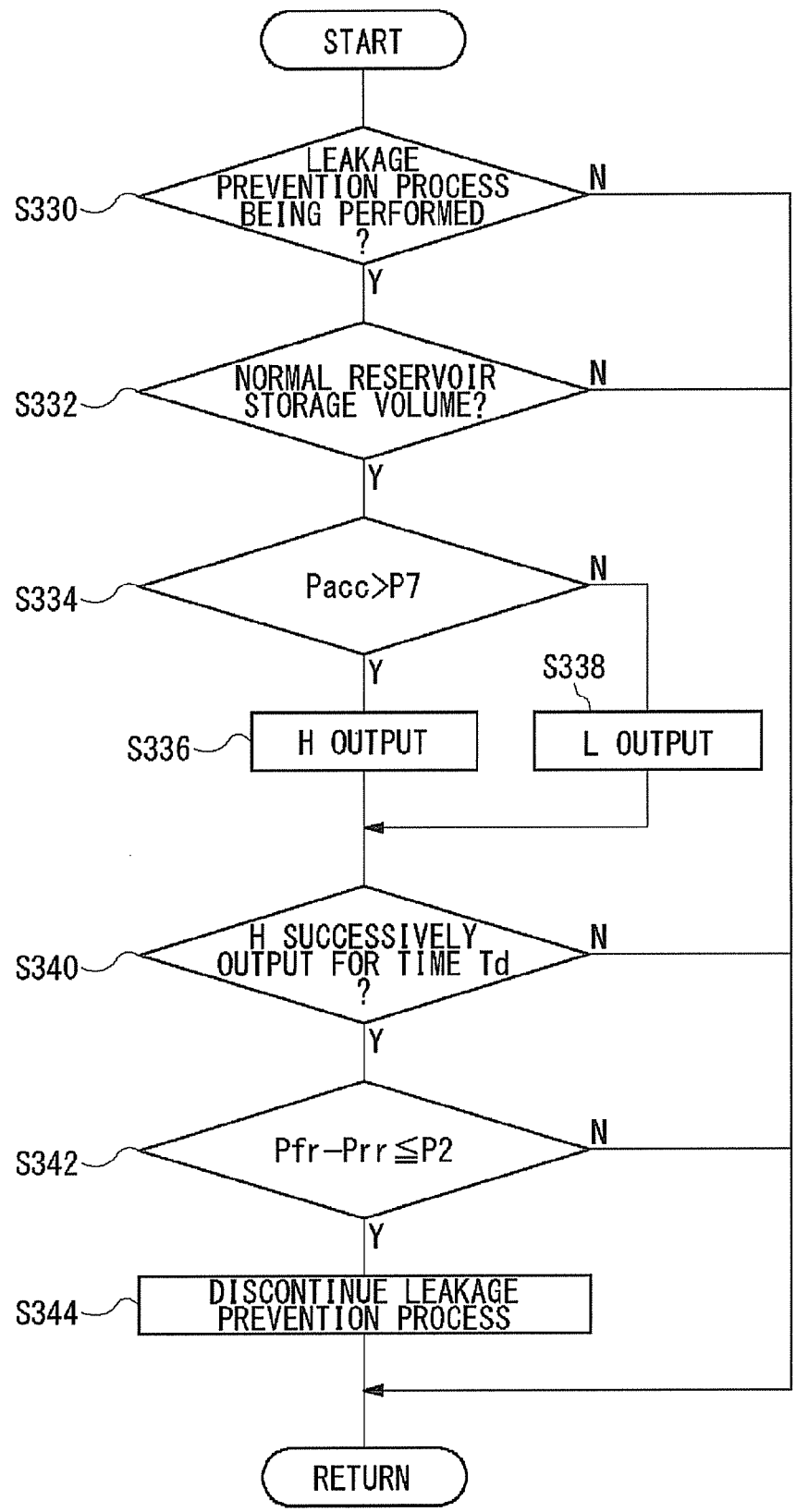
FIG. 22 is a flowchart illustrating an improved version of the process of discontinuing the leakage prevention process shown in FIG. 21.

FIG. 22 is a flowchart illustrating an improved version of the process of discontinuing the leakage prevention process shown in FIG. 21. When the leakage prevention process is not being performed (N in S330), the process of discontinuing the leakage prevention process is not performed. When the leakage prevention process is being performed (Y in S330), the storage volume determination unit 112 monitors a signal from the switch 87 for detecting storage volume reduction and determines whether the storage volume of the reservoir 34 is normal (S332). The storage volume determination unit 112 determines that the storage volume of the reservoir 34 is not normal upon reception of an ON signal (N in S332). With this, the leakage prevention unit 150 continues to perform the leakage prevention process. On the other hand, the storage volume determination unit 112 determines that the storage volume is normal upon reception of an OFF signal (Y in S332).

The hydraulic pressure determination unit 122 compares the accumulator pressure Pacc with a predetermined value P7 (S334). When the accumulator pressure Pacc is larger than P7 (Y in S334), the hydraulic pressure determination unit 122 outputs an H value to the buffer memory as a comparison result (S336). When the accumulator pressure Pacc is P4 or less or when the comparison cannot be carried out (N in S334), the hydraulic pressure determination unit 122 outputs an L value to the buffer memory as a comparison result (S338). This comparison is carried out at a predetermined cycle, and comparison results obtained for a predetermined period of time is stored in the buffer memory.

In reference to comparison results stored in the buffer memory, from the latest one through an earlier one stored at the present time minus the time Td, the hydraulic pressure determination unit 122 determines whether the H value has been successively output for the time Td (S340). When all the comparison results indicate the H value, the hydraulic pressure determination unit 122 determines that a state where the accumulator pressure Pacc is larger than the predetermined value P7 has continued for the time Td (Y in S340). On the other hand, when even one L value is present in the comparison results, the hydraulic pressure determination unit 122 determines that the state where the accumulator pressure Pacc is larger than the predetermined value P7 has not continued for the time Td (N in S340). The determination process in S340 is performed every time the comparison process in S334 is carried out.

When the state where Pacc is larger than P7 has continued for the time Td, the differential pressure determination unit 120 determines whether the differential pressure between Pfr and Prr is P2 or less (S342). When the differential pressure between Pfr and Prr is larger than P2 (N in S342), a leakage prevention process is continued. On the other hand, when the differential pressure between Pfr and Prr is P2 or less (Y in S342), the accumulator pressure Pacc is back to a normal value, and the isolation valve 60 does not automatically open right away even when the master cut valve 64 is opened. Thus, the leakage prevention unit 150 discontinues the leakage prevention process (S346).

Not only the aforementioned embodiment but the combinations of the elements of the embodiments will also be within the scope of the present invention. Various variations including design variations can be made to the embodiments by those skilled in the art and such variations are also within the scope of the present invention.

For example, the driving mode determination process is explained in FIG. 14. However, in addition to being used as a condition for performing the leakage prevention process, the determination process may be also used as a condition for discontinuing the leakage prevention process after the master cut valve 64 is closed.

INDUSTRIAL APPLICABILITY

The present invention can be used in the field of brake control.

The invention claimed is:

1. A brake control apparatus comprising:
a first wheel cylinder configured to exert braking force on a first wheel;
a second wheel cylinder configured to exert braking force on a second wheel different from the first wheel;
a first hydraulic pressure circuit configured to supply brake fluid from a reservoir to the first wheel cylinder;
a second hydraulic pressure circuit configured to supply the brake fluid from the reservoir to the second wheel cylinder;
a manual hydraulic pressure source configured to generate hydraulic pressure in accordance with an amount of brake operation;
an isolation valve provided in a main flow channel that brings the first hydraulic pressure circuit and the second hydraulic pressure circuit into communication with each other;
a problem detection unit configured to detect a problem related to brake fluid pressure;
a control unit configured to bring the isolation valve into a closed state when the problem related to the brake fluid pressure is detected by the problem detection unit; and the hydraulic pressure generated by the manual hydraulic pressure source is supplied to at least the first hydraulic pressure circuit; and
a leakage prevention unit configured to perform a leakage prevention process for preventing the brake fluid in the first hydraulic pressure circuit from flowing into the second hydraulic pressure circuit after the isolation valve is brought into the closed state by the control unit,
wherein the isolation valve is a differential pressure valve that opens when differential pressure across the isolation valve becomes at least a predetermined value P1
wherein the brake control apparatus further comprising:
a first fluid pressure detection unit configured to detect brake fluid pressure in the first hydraulic pressure circuit; and
a second fluid pressure detection unit configured to detect brake fluid pressure in the second hydraulic pressure circuit, wherein the leakage prevention unit performs the leakage prevention process when differential pressure derived from a detection value by the first fluid pressure detection unit and a detection value by the second fluid pressure detection unit exceeds a predetermined value P2 that is smaller than the predetermined value P1.

2. The brake control apparatus according to claim 1, wherein the leakage prevention unit performs the leakage prevention process by bringing a control valve into a closed state.

3. The brake control apparatus according to claim 2, wherein the control valve is provided in the middle between the reservoir and the isolation valve in the first hydraulic pressure circuit.

4. The brake control apparatus according to claim 1 further comprising:
a first determination unit configured to determine that the amount of the brake fluid in the reservoir has fallen below a standard value;
a second fluid pressure detection unit configured to detect brake fluid pressure in the second hydraulic pressure circuit or a third fluid pressure detection unit configured to detect brake fluid pressure in an accumulator flow channel;
a second determination unit configured to determine a pressure-drop problem based on a state where the brake fluid pressure in the second hydraulic pressure circuit is below a predetermined value P3 or where the brake fluid pressure in the accumulator flow channel is below a predetermined value P4; and
a leakage detection unit configured to detect leakage of the brake fluid to the outside, wherein
the leakage detection unit detects the leakage of the brake fluid to the outside in the second hydraulic pressure circuit when it is determined by the first determination unit that the amount of the brake fluid has fallen below the standard value and when the pressure-drop problem is determined by the second determination unit.

5. The brake control apparatus according to claim 4, wherein the second determination unit determines the pressure-drop problem upon continuation of the state for time Ta, where the brake fluid pressure in the second hydraulic pressure circuit is below the predetermined value P3, or upon continuation of the state for time Tb, where the brake fluid pressure in the accumulator flow channel is below the predetermined value P4.

6. The brake control apparatus according to claim 5, wherein
the brake control apparatus performs a system check at the time of startup, and
the second determination unit determines the pressure-drop problem immediately after the system check upon continuation of the state for a period of less than the time Ta, where the brake fluid pressure in the second hydraulic pressure circuit is below the predetermined value P3, or upon continuation of the state for a period of less than the time Tb, where the brake fluid pressure in the accumulator flow channel is below the predetermined value P4.

7. The brake control apparatus according to claim 1, wherein the leakage prevention unit performs the leakage prevention process when the brake fluid pressure in the first hydraulic pressure circuit is above a predetermined value P5.

8. The brake control apparatus according to claim 7, wherein the leakage prevention unit stops the leakage prevention process for the moment when the brake fluid pressure in the first hydraulic pressure circuit falls below a predetermined value P6.

9. The brake control apparatus according to claim 1 further comprising:
a pressurization condition determination unit configured to determine a pressurization condition of the first hydraulic pressure circuit, wherein
the leakage prevention unit performs the leakage prevention process when it is determined by the pressurization condition determination unit that the first hydraulic pressure circuit is in a pressurizable state.

10. The brake control apparatus according to claim 9, wherein the pressurization condition determination unit determines the pressurization condition based on an output from a brake pedal stroke detection unit.

11. The brake control apparatus according to claim 10, wherein the leakage prevention unit performs the leakage prevention process when it is determined by the pressurization condition determination unit that a pedal stroke amount is above a predetermined amount L1.

12. The brake control apparatus according to claim 9, wherein the leakage prevention unit discontinues the leakage prevention process that is being performed when it is determined by the pressurization condition determination unit that the first hydraulic pressure circuit is not being pressurized.

13. The brake control apparatus according to claim 11, wherein the pressurization condition determination unit stores in advance a pedal stroke amount L2, which is obtained at the time of performing the leakage prevention process, and the leakage prevention unit discontinues the leakage prevention process that is being performed when a pedal stroke amount falls below a stroke amount of L2−Lr (Lr is a predetermined amount) or a predetermined amount L3 (L3 is smaller than L1), whichever is smaller.

14. The brake control apparatus according to claim 1 further comprising:

a problem determination unit configured to determine an output problem of a brake pedal stroke detection unit or a brake-fluid pressure detection unit, wherein the leakage prevention unit discontinues the leakage prevention process that is being performed when the output problem is determined by the problem determination unit.

15. The brake control apparatus according to claim 4, wherein the leakage prevention unit discontinues the leakage prevention process that is being performed when it is determined by the first determination unit that the amount of the brake fluid has become at least the standard value.

16. The brake control apparatus according to claim 15, wherein the leakage prevention unit discontinues the leakage prevention process that is being performed when the brake fluid pressure in the accumulator flow channel is above a predetermined value P7.

17. The brake control apparatus according to claim 1, wherein the leakage prevention unit prohibits the leakage prevention process from being performed when a vehicle is being tested or on maintenance.

* * * * *